(12) United States Patent
Huang et al.

(10) Patent No.: US 12,223,160 B2
(45) Date of Patent: Feb. 11, 2025

(54) CARD UNIT PRESENTATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Yana Huang, Shenzhen (CN); Canyan Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/072,624

(22) Filed: Nov. 30, 2022

(65) Prior Publication Data

US 2023/0097857 A1    Mar. 30, 2023

Related U.S. Application Data

(63) Continuation of application No. PCT/CN2022/085548, filed on Apr. 7, 2022.

(30) Foreign Application Priority Data

May 21, 2021 (CN) .......................... 202110560386.1

(51) Int. Cl.
*G06F 3/04842* (2022.01)
*G06F 3/04883* (2022.01)

(52) U.S. Cl.
CPC ...... *G06F 3/04842* (2013.01); *G06F 3/04883* (2013.01)

(58) Field of Classification Search
CPC ............. G06F 3/04842; G06F 3/04883; G06F 3/0483; G06F 3/0488; G06F 3/0484; G06F 3/1407
See application file for complete search history.

(56) References Cited

U.S. PATENT DOCUMENTS

2009/0307623 A1* 12/2009 Agarawala .......... G06F 3/04815
   345/173
2010/0229129 A1*  9/2010 Price .................... G06F 3/04883
   715/863
2016/0062616 A1*  3/2016 Lee ........................ G06F 3/0482
   715/766

FOREIGN PATENT DOCUMENTS

| CN | 108920056 A | 11/2018 |
| CN | 109688454 A | 4/2019 |
| CN | 111124219 A | 5/2020 |
| CN | 112068744 A | 12/2020 |

(Continued)

OTHER PUBLICATIONS

Tencent Technology, ISR, PCT/CN2022/085548, Jun. 20, 2022, 2 pgs.

(Continued)

*Primary Examiner* — Pei Yong Weng
(74) *Attorney, Agent, or Firm* — Morgan, Lewis & Bockius LLP

(57) ABSTRACT

A computing device presents a plurality of non-overlapping card units in a card presentation region. The plurality of card units includes at least one of: a single card or a card deck. In response to detecting an aggregation operation for at least two target card units in the plurality of card units, the computing device aggregates the at least two target card units to form at least one target card deck. Cards in a respective target card deck belong to the same category.

20 Claims, 11 Drawing Sheets

(56) References Cited

FOREIGN PATENT DOCUMENTS

| | | |
|---|---|---|
| CN | 112527431 A | 3/2021 |
| CN | 113515227 A | 10/2021 |

OTHER PUBLICATIONS

Tencent Technology, WO, PCT/CN2022/085548, Jun. 20, 2022, 4 pgs.
Tencent Technology, IPRP, PCT/CN2022/085548, Nov. 21, 2023, 5 pgs.

* cited by examiner

CARD UNIT PRESENTATION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/085548, entitled "CARD UNITS DISPLAY METHODS, DEVICES, COMPUTER EQUIPMENT AND STORAGE MEDIA" filed on Apr. 7, 2022, which claims priority to Chinese Patent Application No. 202110560386.1, filed with the State Intellectual Property Office of the People's Republic of China on May 21, 2021, and entitled "CARD UNIT PRESENTATION METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a card unit presentation method and apparatus, a computer device, and a non-transitory computer readable storage medium.

BACKGROUND OF THE DISCLOSURE

With the development of computer technologies, functions of various smart display screens have become increasingly more abundant, such as making calls, navigating, listening to radio, playing music, and searching for information, so as to facilitate user operations.

However, a display screen is small in size, and displays limited content. In an information search process, information required by a user may be found probably by pulling down a menu or turning pages for multiple times, and the operation is cumbersome.

SUMMARY

According to various embodiments provided in this application, a card unit presentation method and apparatus, a computer device, and a computer readable storage medium are provided.

In accordance with some embodiments, a card unit presentation method is performed by a terminal. The method includes:
presenting a plurality of non-overlapping card units in a card presentation region, the plurality of card units including at least one of a single card or a card deck; and
aggregating, in response to detecting an aggregation operation for at least two target card units in the plurality of card units, the at least two target card units to form at least one target card deck; cards in the same target card deck being associated. In some embodiments, cards in a respective target card deck belong to the same category.

In accordance with some embodiments, a card unit presentation apparatus includes:
a presentation module configured to present a plurality of non-overlapping card units in a card presentation region, the plurality of card units including at least one of a single card or a card deck; and
an aggregation module configured to aggregate, in response to an aggregation operation for at least two target card units in the plurality of card units, the at least two target card units to form at least one target card deck; cards in the same target card deck being associated.

In accordance with some embodiments, a computer device includes a memory and one or more processors. The memory stores computer-readable instructions, and the computer-readable instructions, when executed by the processor, cause the processor to perform the steps in the foregoing card unit presentation method.

In accordance with some embodiments, one or more non-volatile readable storage media are provided, storing computer-readable instructions, the computer-readable instructions, when executed by one or more processors, causing the one or more processors to perform the steps of the card unit presentation method.

In accordance with some embodiments, a computer program product includes computer-readable instructions, the computer-readable instructions, when executed by one or more processors, causing the one or more processors to perform the steps of the card unit presentation method.

Details of one or more embodiments of this application are provided in the accompanying drawings and descriptions below. Other features, objectives, and advantages of this application are illustrated in the specification, the accompanying drawings, and the claims.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings of embodiments without creative efforts.

DESCRIPTION OF EMBODIMENTS

Figure 1:
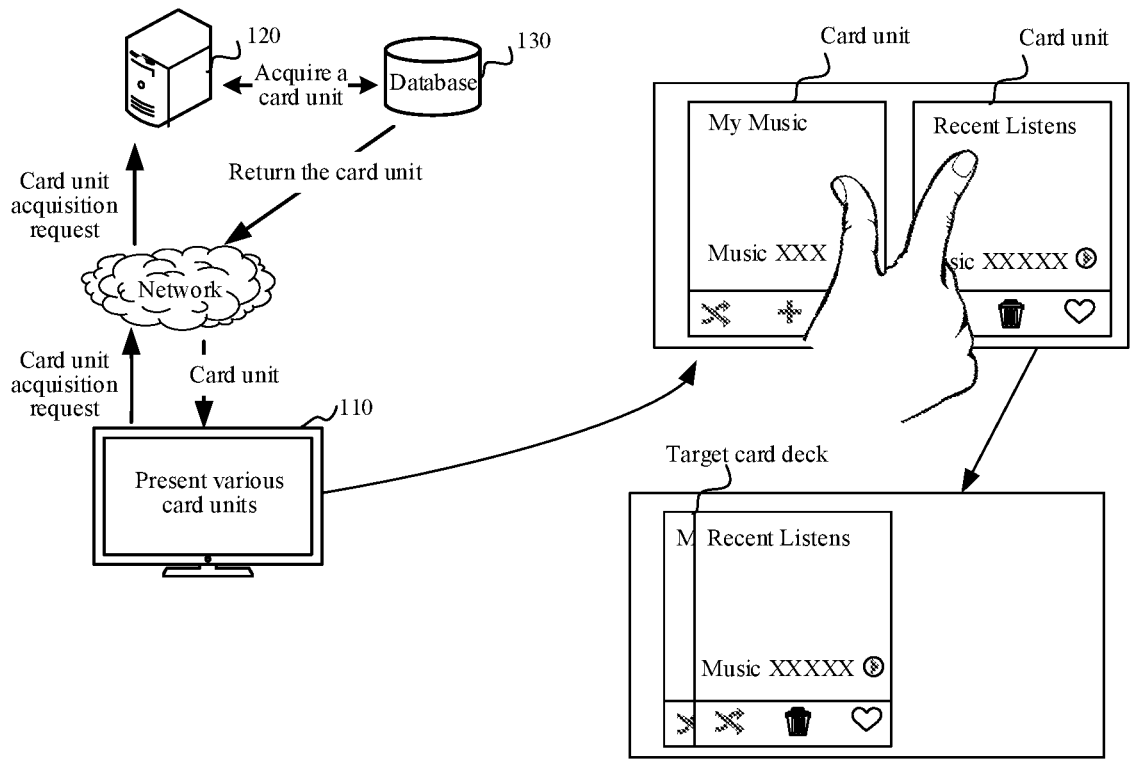
FIG. 1 is a diagram of an application environment of a card unit presentation method according to one embodiment.

A card unit presentation method provided in this application may be applied to a card unit presentation system as shown in FIG. 1. As shown in FIG. 1, the card unit presentation system includes a terminal 110, a server 120, and a database 130. In one embodiment, the terminal 110 may independently perform the card unit presentation method according to an embodiment of this application. Both the terminal 110 and the server 120 may be alternatively used in cooperation to perform the card unit presentation method provided in the embodiments of this application. When the terminal 110 and the server 120 cooperate to perform the card unit presentation method according to an embodiment of this application, the terminal 110 sends a card unit acquisition request to the server 120, the server 120 acquires a corresponding card unit from the database 130 based on the card unit acquisition request, and the server 120 returns the card units to the terminal 110. The terminal 110 presents a plurality of non-overlapping card units in a card presentation region, and the plurality of card units include at least one of: a single card or a card deck. The terminal 110 aggregates, in response to an aggregation operation of a user for at least two target card units in the plurality of card units, the at least two target card units to form at least one target card deck. Cards in the same target card deck are associated.

The terminal 110 may be any electronic product that can interact with a user through one or more interfaces such as a keyboard, a touch panel, a touch screen, a remote control, a voice interaction, or a handwriting device, for example, a Personal Computer (PC), a mobile phone, a smart phone, a Personal Digital Assistant (PDA), a wearable device, a Pocket PC (PPC), a tablet PC, a vehicle-mounted terminal, a smart TV, a smart speaker, and the like. The server 120 may be an independent physical server, or may be a server cluster composed of a plurality of physical servers or a distributed system, and may further be a cloud server that provides cloud computing services. The terminal 110 and the server 120 may be directly or indirectly connected in a wired or wireless communication manner. This is not limited in this application.

In one embodiment, a plurality of servers may form a blockchain, and the servers are nodes on the blockchain.

Figure 2:
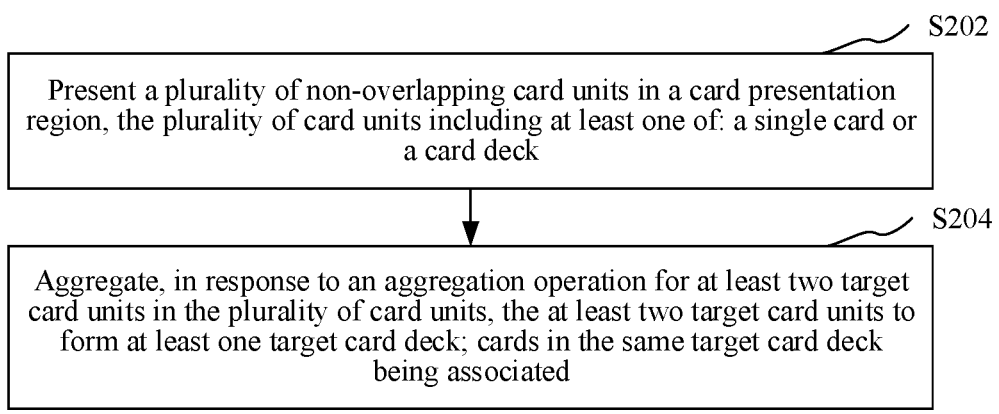
FIG. 2 is a schematic flowchart of a card unit presentation method according to one embodiment.

In an embodiment, as shown in FIG. 2, a card unit presentation method is provided. That the method is applied to the terminal shown in FIG. 1 is used as an example for description. The method includes the following step:

Step S202: Present a plurality of non-overlapping card units in a card presentation region, the plurality of card units including at least one of: a single card or a card deck.

The card is a carrier for carrying information, and can carry various types of information, including but not limited to at least one of a text, an expression, a picture, an audio, a video, a file, and a link. A card deck is a combination obtained by aggregating at least two cards. The card unit is a combination formed by a single card and/or a card deck. Cards in the same card deck are associated.

Specifically, the terminal presents a card presentation region on an interface, and presents a plurality of card units in the card presentation region, the plurality of referring to at least two. The plurality of card units presented in the card presentation region are non-overlapping.

The plurality of card units include at least one of: a single card or a card deck. When a plurality of cards are presented in the card presentation region, the plurality of cards presented are non-overlapping. When a plurality of card units are presented in the card presentation region, the plurality of presented card units are non-overlapping. In accordance with presenting at least one card and at least one card unit in the card presentation region, the presented cards and/or card units are presented independently without overlapping each other.

In one embodiment, the terminal may enter an application interface or a webpage interface, and pull, from the server, information content of a presented current interface. The terminal renders the acquired information content to form various card views. The card view refers to a virtual memory table in a computer database, which is used for presenting specified information content or information entry, and has a feature of interactivity.

The terminal loads each card view and renders corresponding information content. The rendering information content refers to image processing performed by the terminal after loading or preloading the information content in a specified card view. It is understandable that the rendering processing for the information content in different card views may be the same or different. The terminal presents the rendered information content in the card presentation region of the current interface in the form of a card unit.

In one embodiment, the rendering includes, but is not limited to, color rendering, image rendering, transparency setting, light setting, and line setting. For example, after loading information content in a card view, color rendering is performed so that a background color in the card is gradient blue, the transparency is 35%, and a background pattern is water flow.

In one embodiment, the user may run an application on the terminal to enter an application interface, and the terminal displays a card presentation region on the current interface of the application. The application is any application that can interact with the user, including but not limited to a parent application, a child application, a cloud application, and the like. A parent application refers to an application that can run independently. A child application refers to an application that cannot run independently and needs to be run with the help of a parent application.

A cloud application refers to an application for the terminal to interact with the cloud. The cloud application uses the powerful computing power of a cloud simulator to encode a running process into audio and video streams, which are transmitted to a mobile phone terminal through a network to realize the interaction with the user. The cloud application may be any application running in the cloud.

The parent application, the child application, and the cloud application may include, but not limited to, an instant messaging application, a Social Network Sites (SNS) application, a short video application, a long video application, a game application, a music application, a shopping and sales application, and a User Generated Content (UGC) application.

Step S204: Aggregate, in response to detecting (e.g., receiving) an aggregation operation for at least two target card units in the plurality of card units, the at least two target card units to form at least one target card deck; cards in the same target card deck are associated.

The aggregation operation is a preset (e.g., predefined) operation for aggregating at least two card units, and the arbitrary operation includes but is not limited to: a gesture aggregation operation, a voice aggregation operation, a cursor aggregation operation, a key aggregation operation, and the like. The gesture aggregation operation may include at least one of a swipe gesture aggregation operation, an air gesture aggregation operation, a click/tap gesture aggregation operation, or a press gesture aggregation operation. The swipe gesture aggregation operation may specifically be a single-point swipe-to-aggregate operation or a multi-point swipe-to-aggregate operation, and a swipe gesture spreading operation may specifically refer to a contact gesture spreading operation. The air gesture aggregation operation refers to a non-contact gesture aggregation operation, and may specifically refer to that there is a preset distance between an air gesture and an object acted on by the air gesture, or a distance between the two is within a preset distance range. The click/tap gesture aggregation operation may specifically be a single-point touch-to-aggregate operation, a multi-point touch-to-aggregate operation, or the like. The press gesture aggregation operation may specifically be a single-point press-to-aggregate operation, a multi-point press-to-aggregate operation, or the like. The cursor aggregation operation may be an operation of controlling a cursor for performing any one of click/tap, double-click/tap, press, or swipe to perform aggregation. The key aggregation operation may be a virtual key aggregation operation, a physical key aggregation operation, or the like. This is not limited.

The target card unit refers to a card unit acted on by the aggregation operation, and the target card deck is a card deck obtained by aggregating various target card units acted on by the aggregation operation.

Specifically, the terminal presets associations between the cards, associated cards may be aggregated into the same card deck, and the cards that are not associated cannot be aggregated into the same card deck. The user may aggregate at least two card units in various card unit presented in the card presentation region, and the terminal determines, in response to the aggregation operation for the at least two card units, various card units acted on by the aggregation operation, and aggregates the card units acted on by the aggregation operation to form at least one target card deck. The target card deck is presented in the card presentation region.

In one embodiment, in response to the aggregation operation for at least two card units, the terminal determines whether the card units acted on by the aggregation operation are associated. When the card units acted on by the aggregation operation are associated, the card units are aggregated into the same target card deck. When the card units acted on by the aggregation operation are not associated, the card units are not aggregated.

In one embodiment, when among the card units acted on by the aggregation operation, some card units are associated and some card units are not associated, the card units that are associated are aggregated into the same target card deck, and the card units that are not associated are not aggregated.

In the above card unit presentation method, a plurality of non-overlapping card units are presented in the card presentation region, and the plurality of card units include at least one of a single card or a card deck. In response to the aggregation operation for at least two target card units in the plurality of card units, the at least two target card units are aggregated into at least one target card deck, and cards in the same target card deck are associated, so that the associated cards may be aggregated by the aggregation operation, which facilitates the user to organize the card units, improves the operation efficiency, and can reduce an area occupied by the cards in the card presentation region. Aggregating the cards for presentation can present more cards in the card presentation region, which is convenient for the user to search for a required card, thereby improving the efficiency of the user in searching for information.

In one embodiment, aggregating, in response to an aggregation operation for at least two target card units in the plurality of card units, the at least two target card units to form at least one target card deck includes:

aggregating, in response to the aggregation operation for at least two target card units in the plurality of card units, target card units under the same card stack into a target card deck according to card stacks to which the target card units belong respectively, so as to form at least one target card deck.

Specifically, the terminal classifies various cards into different card stacks in advance, and cards in the same card stack are associated.

The terminal presents a plurality of non-overlapping card units in the card presentation region, and in accordance with detecting an aggregation operation, the terminal determines at least two target card units acted on by the aggregation operation. The terminal determines the card stack to which each target card unit acted on by the aggregation operation belongs respectively, and when the target card units belong to the same card stack, the target card units are aggregated to form a card deck. When the target card units do not belong to the same card stack, target card units corresponding to the same card stack are aggregated into a target card deck. According to the same processing method, at least two target card units acted on by the aggregation operation may be aggregated according to the card stacks to which they belong respectively, so as to form at least one target card deck.

In one embodiment, the aggregation operation may include a gesture aggregation operation. In response to a gesture aggregation operation for at least two target card units in the plurality of card units, the terminal determines various target card units acted on by the gesture aggregation operation, and determines card stacks to which the target card units belong, respectively. Target card units belonging to the same card stack in the target card units are aggregated into a target card deck, so as to form at least one target card deck.

In one embodiment, the aggregation operation may include a voice aggregation operation. In response to a voice aggregation operation for at least two target card units in the plurality of card units, target card units under the same card stack are aggregated into a target card deck according to card stacks to which the target card units belong respectively, so as to form at least one target card deck.

In this embodiment, in response to the aggregation operation for at least two target card units in the plurality of card units, the target card units under the same card stack are aggregated into a deck according to the card stacks to which the target card units belong respectively. Therefore, associated cards can be quickly classified into the same deck through a simple operation to realize efficient and convenient aggregation of cards. In addition, a plurality of cards are aggregated into a deck, which can reduce a display area occupied by the card units.

In one embodiment, the aggregation operation includes a gesture aggregation operation. Aggregating, in response to an aggregation operation for at least two target card units in the plurality of card units, the at least two target card units to form at least one target card deck includes:

aggregating, in response to a gesture aggregation operation for at least two target card units in the plurality of card units, at least two target card units acted on by the gesture aggregation operation to form a target card deck.

Specifically, the aggregation operation includes a gesture aggregation operation. The terminal presents a plurality of non-overlapping card units in the card presentation region, and the user may aggregate at least two target card units through a gesture. In accordance with detecting a gesture aggregation operation of the user, the terminal determines various target card units acted on by the gesture aggregation operation. The terminal aggregates the target card units acted on by the gesture aggregation operation into a deck to obtain a target card deck.

In one embodiment, the gesture aggregation operation includes a single-point touch-to-aggregate operation. When the gesture aggregation operation includes a single-point touch-to-aggregate operation, the user may sequentially touch various card units that need to be aggregated within a preset time period. The terminal detects the card units touched by the user within the preset time period, regards the touched card units as target card units, and aggregates the target card units into a deck. For example, the user may sequentially touch two card units among the plurality of card units with a finger to aggregate the two touched card units. The terminal detects touch operations of the user for the two card units within the preset time period, and aggregates the two card units touched by the user to obtain the target card deck.

In one embodiment, the gesture aggregation operation includes a multi-point touch-to-aggregate operation. When the gesture aggregation operation includes a multi-point touch-to-aggregate operation, the user may simultaneously touch various card units that need to be aggregated. The terminal detects the card units touched by the user simultaneously, and aggregates the card units into a deck.

In this embodiment, in response to the gesture aggregation operation for at least two target card units in the plurality of card units, the at least two target card units acted on by the gesture aggregation operation may be aggregated into a deck. Therefore, associated cards can be classified into the same deck quickly through a simple gesture operation, thereby reducing a display area occupied by the card units.

In one embodiment, the aggregation operation includes a gesture aggregation operation. Aggregating target card units under the same card stack into a target card deck according to card stacks to which the target card units belong respectively, so as to form at least one target card deck includes:

aggregating, for two target card units acted on by the gesture aggregation operation and various target card units between the two target card units, target card units under the same card stack into a target card deck according to the card stacks to which the target card units belong respectively, so as to form at least one target card deck.

Specifically, the aggregation operation includes a gesture aggregation operation. The terminal presents a plurality of non-overlapping card units in the card presentation region, and the user may aggregate at least two target card units belonging to the same card stack through a gesture. In accordance with detecting a gesture aggregation operation, the terminal determines two target card units acted on by the gesture aggregation operation, and determines whether there is a card unit between the two target card units. When there is a card unit between the two target card units, card stacks to which the two target card units acted on by the gesture aggregation operation and card units between the two target card units belong respectively are determined, and among the two target card units and the card units between the two target card units, target card units belonging to the same card stack are aggregated into a target card deck. According to the same processing method, at least two target card units acted on by the aggregation operation may be aggregated according to the card stacks to which they belong respectively, so as to form at least one target card deck.

In this embodiment, for the two target card units acted on by the gesture aggregation operation and the various target card units between the two target card units, target card units under the same card stack are aggregated into a deck, so that the plurality of presented cards are classified quickly through one gesture aggregation operation according to the card stacks, which can improve the efficiency of card aggregation.

In one embodiment, the aggregation operation includes a gesture aggregation operation. Aggregating, in response to an aggregation operation for at least two target card units in the plurality of card units, the at least two target card units to form at least one target card deck includes:

aggregating, in response to a gesture aggregation operation for two target card units in the plurality of card units, two target card units acted on by the gesture aggregation operation and card units between the two target card units to form a target card deck.

Specifically, the terminal presents a plurality of non-overlapping card units in the card presentation region. The user may aggregate at least two target card units through a gesture. In accordance with detecting a gesture aggregation operation, the terminal determines two target card units acted on by the gesture aggregation operation, and determines whether there is a card unit between the two target card units. When there is a card unit between the two target card units, the two target card units acted on by the gesture aggregation operation and card units between the two target card units are aggregated to obtain a target card deck.

Specifically, the user may aggregate at least two target card units through a gesture. In accordance with detecting a gesture aggregation operation, the terminal determines two target card units acted on by the gesture aggregation operation, and determines whether there is a card unit between the two target card units. When there is a card unit between the two target card units, the two target card units acted on by the gesture aggregation operation and card units between the two target card units are aggregated to obtain a target card deck.

In this embodiment, in response to the gesture aggregation operation for two target card units in the plurality of card units, the two target card units acted on by the gesture aggregation operation and the card units between the two target card units may be aggregated into a deck, so that a plurality of cards may be quickly classified into a deck through one gesture aggregation operation, which can improve the efficiency of card aggregation.

Figure 3:
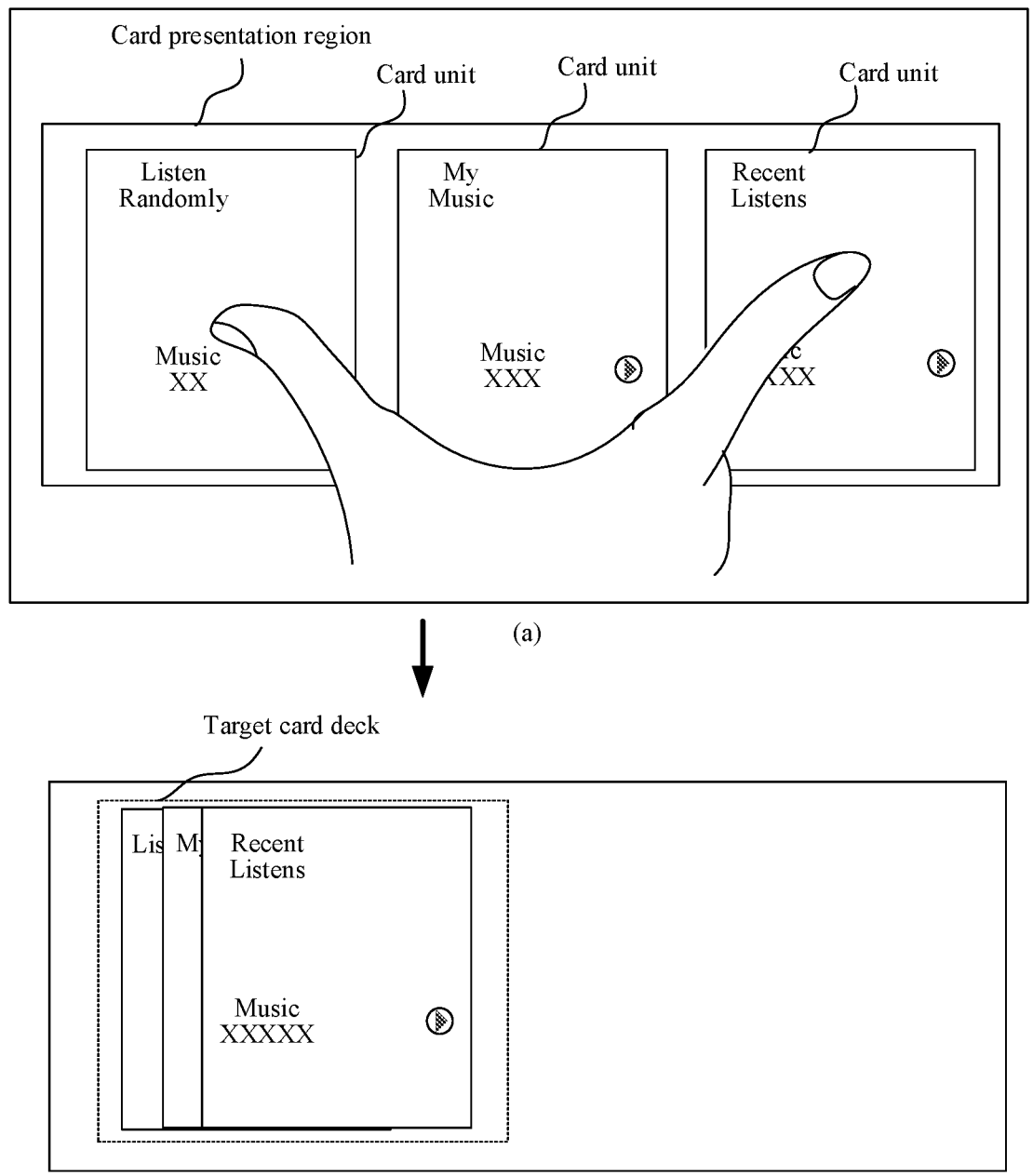
FIG. 3 is a schematic interface diagram of aggregating two target card units acted on by a gesture aggregation operation and various card units between the two target card units according to one embodiment.

Referring to FIG. 3, a schematic interface diagram of aggregating two target card units acted on by a gesture aggregation operation and various card units between the two target card units according to one embodiment is shown. The gesture aggregation operation may be a swipe gesture aggregation operation or an air gesture aggregation operation. In a card presentation region shown in FIG. 3(a), three cards of "Listen Randomly", "My Music", and "Recent Listens" are presented. The user pinches two cards "Listen Randomly" and "Recent Listens" toward the middle by a swipe gesture or an air gesture to aggregate the three cards "Listen Randomly", "My Music", and "Recent Listens". In response to the aggregation operation, the terminal aggregates the three cards "Listen Randomly", "My Music", and "Recent Listens" to form a target card deck, thus forming a target card deck as shown in FIG. 3(b).

In one embodiment, the aggregation operation includes a gesture aggregation operation. Aggregating target card units under the same card stack into a target card deck according to card stacks to which the target card units belong respectively, so as to form at least one target card deck includes:
  determining target card stacks to which at least two target card units acted on by the gesture aggregation operation belong, and aggregating all card units under the same target card stack into a target card deck, so as to form at least one target card deck.

Specifically, the terminal classifies various cards into different card stacks in advance, and cards in the same card stack are associated.

The aggregation operation includes a gesture aggregation operation. The terminal presents (e.g., displays) a plurality of non-overlapping card units in the card presentation region, and in accordance with detecting a gesture aggregation operation of the user, the terminal determines at least two target card units acted on by the gesture aggregation operation. The terminal determines a target card stack to which each of the target card units acted on by the gesture aggregation operation belongs respectively, and for each target card stack, aggregates all cards under the corresponding target card stack according to card stack to which they belong, so as to obtain a target card deck corresponding to each target card stack.

For example, target card units acted on by a gesture aggregation operation are a card A and a card B. The terminal determines a card stack A to which the card A belongs and a card stack B to which the card B belongs, aggregates all cards in the card stack A to form a target card deck A, and aggregates all card decks in the card stack B to form a target card deck B, so that the target card deck A and the target card deck B are presented in the card presentation region.

In one embodiment, the terminal determines at least two target card units acted on by the gesture aggregation operation, and determines whether the at least two target card units belong to the same target card stack. When the at least two target card units belong to the same target card stack, all cards in the same target card stack are aggregated to form a target card deck. When the at least two target card units do not belong to the same target card stack, a target card stack to which each of the target card units belongs is determined respectively, and all cards under each target card stack are aggregated according to the target card stack to which they belong, so as to obtain a target card deck corresponding to each target card stack. Further, the terminal may determine whether the at least two target card units belong to the same card stack according to whether the at least two target card units are associated.

In one embodiment, the aggregation operation includes a gesture aggregation operation. Aggregating, in response to an aggregation operation for at least two target card units in the plurality of card units, the at least two target card units to form at least one target card deck includes:
  aggregating, in response to the gesture aggregation operation for at least two target card units in the plurality of card units, all cards under target card stacks corresponding to the at least two target card units acted on by the gesture aggregation operation according to the corresponding target card stacks, so as to form at least one target card deck.

In this embodiment, all cards in different card stacks can be aggregated according to corresponding card stacks through one gesture aggregation operation. Accordingly, a plurality of cards in card stacks can be quickly aggregated, and all cards in different card stacks can be simultaneously aggregated according to the card stacks to which they belong, thereby improving the efficiency of aggregating a plurality of cards into a deck.

In one embodiment, the gesture aggregation operation is a swipe gesture aggregation operation, and the method further includes:
  determining, when a swipe gesture aggregation operation occurs, a swipe-to-aggregate distance and a swipe-to-aggregate speed corresponding to the swipe gesture aggregation operation acting on the at least two target card units respectively; and performing, when at least one of the swipe-to-aggregate distance or the swipe-to-aggregate speed meets an aggregation condition, the step of responding to an aggregation operation for at least two target card units in the plurality of card units.

The aggregation condition refers to a condition for aggregating various target card units into a target card deck. Specifically, the aggregation condition may be at least one of: the swipe-to-aggregate distance is greater than an aggregation distance threshold or the swipe-to-aggregate speed is greater than an aggregation speed threshold. The swipe-to-aggregate distance refers to a distance generated by a swipe gesture acting on the target card unit due to swipe. The swipe-to-aggregate speed refers to a speed of the swipe gesture acting on the target card unit during swipe.

Specifically, the gesture aggregation operation includes a swipe gesture aggregation operation. The terminal presents a plurality of non-overlapping card units in the card presentation region, and the user may aggregate at least two target card units through a swipe gesture. In accordance with detecting a swipe gesture aggregation operation of the user, the terminal determines target card units acted on by the swipe gesture aggregation operation. For each target card unit acted on by the swipe gesture aggregation operation, the terminal detects the swipe-to-aggregate distance and the swipe-to-aggregate speed corresponding to the swipe gesture aggregation operation on the target card unit.

In this embodiment, the terminal may detect the swipe-to-aggregate distance and/or the swipe-to-aggregate speed generated by the swipe gesture aggregation operation acting on the target card unit, and use the generated swipe-to-aggregate distance and/or swipe-to-aggregate speed as the swipe-to-aggregate distance and swipe-to-aggregate speed corresponding to the target card unit.

When at least one of the swipe-to-aggregate distance or the swipe-to-aggregate speed meets the aggregation condition, the terminal aggregates, in response to the swipe gesture aggregation operation for at least two target card units in the plurality of card units, the two target card units acted on by the swipe gesture aggregation operation and various target card units between the two target card units according to the card stacks to which the target card units belong respectively, and aggregates target card units under the same card stack into a target card deck, so as to form at least one target card deck.

In one embodiment, when at least one of: the swipe-to-aggregate distance or the swipe-to-aggregate speed meets the aggregation condition, the terminal determines, in response to the swipe gesture aggregation operation for at least two target card units in the plurality of card units, a target card stack to which each target card unit of the at least two target card units acted on by the gesture aggregation operation belongs, and aggregates all card units under the same target card stack into a target card deck, so as to form at least one target card deck.

In one embodiment, performing, when at least one of: the swipe-to-aggregate distance or the swipe-to-aggregate speed meets the aggregation condition, the step of responding to the aggregation operation for at least two target card units in the plurality of card units includes: performing, when there is at least one of: the swipe-to-aggregate distance being greater than an aggregation distance threshold or the swipe-to-aggregate speed being greater than an aggregation speed threshold, the step of responding to the aggregation operation for at least two target card units in the plurality of card units.

Specifically, for each target card unit acted on by the swipe gesture aggregation operation, the terminal determines the swipe-to-aggregate distance and swipe-to-aggregate speed corresponding to the swipe gesture aggregation operation on the target card unit. When the swipe-to-aggregate distances corresponding to the target card units are greater than the aggregation distance threshold, the step of responding to the aggregation operation for at least two target card units in the plurality of card units is performed.

When the swipe-to-aggregate speeds corresponding to the target card units are greater than the aggregation speed threshold, the step of responding to the aggregation operation for at least two target card units in the plurality of card units is performed.

When the swipe-to-aggregate distances corresponding to the target card units are greater than the aggregation distance threshold, and the swipe-to-aggregate speeds corresponding to the target card units are greater than the aggregation speed threshold, the step of responding to the aggregation operation for at least two target card units in the plurality of card units is performed.

In other embodiments, when at least one swipe-to-aggregate distance in the swipe-to-aggregate distances corresponding to the target card units is greater than the aggregation distance threshold, the step of responding to the aggregation operation for at least two target card units in the plurality of card units is performed.

When at least one swipe-to-aggregate speed in the swipe-to-aggregate speeds corresponding to the target card units is greater than the aggregation speed threshold, the step of responding to the aggregation operation for at least two target card units in the plurality of card units is performed.

When at least one swipe-to-aggregate distance in the swipe-to-aggregate distances corresponding to the target card units is greater than the aggregation distance threshold, and there is at least one swipe-to-aggregate speed in the swipe-to-aggregate speeds corresponding to the target card units that is greater than the aggregation speed threshold, the step of responding to the aggregation operation for at least two target card units in the plurality of card units is performed.

In this embodiment, in response to the swipe gesture aggregation operation for at least two target card units in the plurality of card units, the swipe-to-aggregate distances and the swipe-to-aggregate speeds corresponding to the swipe gesture aggregation operation acting on the at least two target card units are determined respectively, and the swipe-to-aggregate distances and the swipe-to-aggregate speeds are used as conditions for judging whether to aggregate the target card units. This ensures accuracy of the aggregation operation and minimizes misinterpretations of user interactions with the terminal.

In one embodiment, the gesture aggregation operation is an air gesture aggregation operation, and the method further includes:

mapping, when an air gesture aggregation operation occurs, the air gesture aggregation operation to the card presentation region to determine at least two target card units acted on by the air gesture aggregation operation; determining a move-to-aggregate distance and a move-to-aggregate speed corresponding to the air gesture aggregation operation acting on the at least two target card units respectively; and performing, when at least one of: the move-to-aggregate distance or the move-to-aggregate speed meets an aggregation condition, the step of responding to the aggregation operation for at least two target card units among the plurality of card units.

The aggregation condition refers to a condition for aggregating various target card units into a target card deck. Specifically, the aggregation condition may be at least one of: the move-to-aggregate distance being greater than an aggregation distance threshold or the move-to-aggregate speed being greater than an aggregation speed threshold. The move-to-aggregate distance refers to a distance generated by the movement of the air gesture acting on the target card unit. The move-to-aggregate speed refers to a speed of the air gesture acting on the target card unit during moving.

Specifically, the gesture aggregation operation includes an air gesture aggregation operation. The terminal presents a plurality of non-overlapping card units in the card presentation region, and the user may aggregate at least two target card units through an air gesture. In accordance with detecting an air gesture aggregation operation of the user, the terminal may map the air gesture aggregation operation to the card presentation region to determine various target card units acted on by the air gesture aggregation operation. For each target card unit acted on by the air gesture aggregation operation, the terminal detects a move-to-aggregate distance and a move-to-aggregate speed corresponding to the air gesture aggregation operation on the target card unit.

In this embodiment, the terminal may detect the move-to-aggregate distance and the move-to-aggregate speed generated by the air gesture aggregation operation acting on the target card units, and use the generated move-to-aggregate distance and move-to-aggregate speed as the move-to-aggregate distance and move-to-aggregate speed corresponding to the target card unit.

When at least one of the move-to-aggregate distance or the move-to-aggregate speed meets the aggregation condition, for the two target card units acted on by the air gesture aggregation operation and various target card units between the two target card units, the terminal aggregates, in response to the air gesture aggregation operation for at least two target card units in the plurality of card units, target card units under the same card stack into a target card deck according to card stacks to which the target card units belong respectively, so as to form at least one target card deck.

In one embodiment, when at least one of the move-to-aggregate distance or the move-to-aggregate speed meets the aggregation condition, the terminal determines, in response to the air gesture aggregation operation for at least two target card units in the plurality of card units, target card stacks corresponding to the at least two target card units acted on by the gesture aggregation operation, and aggregates all card units under the same target card stack into a target card deck, so as to form at least one target card deck.

In one embodiment, performing, when at least one of the move-to-aggregate distance or the move-to-aggregate speed meets the aggregation condition, the step of responding to the aggregation operation for at least two target card units in the plurality of card units includes: performing, when there is at least one of: the move-to-aggregate distance being greater than an aggregation distance threshold and the move-to-aggregate speed being greater than an aggregation speed threshold, the step of responding to the aggregation operation for at least two target card units in the plurality of card units.

Specifically, for each target card unit acted on by the air gesture aggregation operation, the terminal determines the move-to-aggregate distance and the move-to-aggregate speed corresponding to the air gesture aggregation operation on the target card unit. When the move-to-aggregate distances corresponding to the target card units are greater than the aggregation distance threshold, the step of responding to the aggregation operation for at least two target card units in the plurality of card units is performed.

When the move-to-aggregate speeds corresponding to the target card units are greater than the aggregation speed threshold, the step of responding to the aggregation operation for at least two target card units in the plurality of card units is performed.

When the move-to-aggregate distances corresponding to the target card units are greater than the aggregation distance threshold, and the move-to-aggregate speeds corresponding to the target card units are greater than the aggregation speed threshold, the step of responding to the aggregation operation for at least two target card units in the plurality of card units is performed.

In other embodiments, when there is at least one move-to-aggregate distance in the move-to-aggregate distances corresponding to the target card units that is greater than the aggregation distance threshold, the step of responding to the aggregation operation for at least two target card units in the plurality of card units is performed.

When there is at least one move-to-aggregate speed in the move-to-aggregate speeds corresponding to the target card units that is greater than the aggregation speed threshold, the step of responding to the aggregation operation for at least two target card units in the plurality of card units is performed.

When at least one move-to-aggregate distance in the move-to-aggregate distances corresponding to the target card units is greater than the aggregation distance threshold, and there is at least one move-to-aggregate speed in the move-to-aggregate speeds corresponding to the target card units that is greater than the aggregation speed threshold, the step of responding to the aggregation operation for at least two target card units in the plurality of card units is performed.

In one embodiment, the terminal may detect a gesture operation of the user, and when a distance between the gesture operation of the user and the card presentation region is within a preset distance range, it is further detected whether the gesture operation matches a preset gesture aggregation operation. When the distance between the gesture operation and the card presentation region is within the preset distance range, and the gesture operation matches the preset gesture aggregation operation, it is determined that the gesture operation is an air gesture aggregation operation. Next, the terminal may map the air gesture operation to the card presentation region to determine at least two target card units acted on by the air gesture aggregation operation.

The terminal may detect feature points of the air gesture aggregation operation, and map the feature points to the card presentation region, so as to determine the target card units acted on by the air gesture aggregation operation according to the feature points.

In one embodiment, the method is performed by a vehicle-mounted terminal, and the card presentation region is a presentation region provided by a display screen of the vehicle-mounted terminal. The vehicle-mounted terminal may capture a user gesture through a vehicle-mounted camera, and recognize the user gesture through an in-vehicle visual assistant or in-vehicle positioning assistant to determine whether the user gesture is an air gesture aggregation operation, so as to map the air gesture operation of the user to the card presentation region, for determining at least two target card units acted on by the air gesture aggregation operation.

In this embodiment, by mapping the air gesture aggregation operation to the card presentation region, various target card units acted on by the air gesture aggregation operation can be determined, thereby determining the move-to-aggregate distances and move-to-aggregate speeds of the air gesture aggregation operation corresponding to the target card units, the move-to-aggregate distances and move-to-aggregate speeds are used as conditions for judging whether to aggregate the target card units, which can avoid card aggregation caused by misinterpretation of the user's interactions. In addition, a plurality of cards in the same card stack are aggregated through the air gesture aggregation operation. When it is inconvenient for the user to realize the card aggregation by direct contact, the user is provided with a method for realizing card aggregation by a non-contact gesture, which can meet uses of users in different scenarios, and is convenient in operation.

In one embodiment, the aggregation operation includes a voice aggregation operation. Aggregating target card units under the same card stack into a target card deck according to card stacks to which various target card units belong respectively, so as to form at least one target card deck includes:

determining target card stacks corresponding to at least two target card units specified by the voice aggregation operation, and aggregating all card units under the same target card stack into a target card deck, so as to form at least one target card deck.

Specifically, the aggregation operation includes a voice aggregation operation, and the voice aggregation operation refers to an operation of aggregating a plurality of cards through voice. The terminal presents a plurality of non-overlapping card units in the card presentation region, and in accordance with detecting a voice aggregation operation of the user for at least two target card units in the plurality of card units, the terminal determines at least two target card units acted on by the voice aggregation operation. The terminal determines a card stack corresponding to each target card unit acted on by the voice aggregation operation respectively, and aggregates, for each card stack, all cards under the corresponding card stack according to the card stack to which they belong, so as to obtain a target card deck corresponding to each card stack.

In this embodiment, the target card stacks corresponding to the at least two target card units specified by the voice aggregation operation are the target card stacks to which the target card units in the at least two target card units specified by the voice aggregation operation belong.

In one embodiment, the terminal detects the voice aggregation operation of the user, and performs content recognition on the user's voice to determine a target card unit. When there is one target card unit, the terminal determines a card stack corresponding to the target card unit, and aggregates all cards under the card stack to obtain the target card unit. The card stack corresponding to the target card unit is the card stack to which the target card unit belongs.

When there are at least two target card units, the terminal determines whether the at least two target card units belong to the same card stack. When the at least two target card units belong to the same card stack, all cards in the same card stack are aggregated to form a target card deck. When the at least two target card units do not belong to the same card stack, card stacks corresponding to the target card units are determined respectively, and all cards under each card stack are aggregated according to the card stack to which they belong, so as to obtain a target card deck corresponding to each card stack.

In one embodiment, when the target card unit is a card deck, the terminal determines various card decks acted on by the voice aggregation operation, and determines a card stack corresponding to each card deck. The terminal aggregates all cards under each card stack according to the card stack to which they belong, and obtains a target card deck corresponding to each card stack. For example, when the user expresses, by voice, to aggregate a card deck A, it means that the user needs to aggregate all cards in a card stack A corresponding to the card deck A, and the terminal automatically aggregates all the cards in the card stack A.

In an embodiment, the method further includes: acquiring categories to which various cards belong respectively, and classifying cards belonging to the same category into the same card stack corresponding to the category; and classifying, for cards without a belonging category, the cards without a belonging category collectively into the same card stack.

Specifically, the terminal may determine the categories to which the cards belong, and set corresponding card stacks according to the categories. The terminal may classify cards belonging to the same category into the corresponding card stack. For cards without a belonging category, the terminal may define a new card stack, and collectively classify the cards without a belonging category into the same defined card stack.

For example, the categories of cards include "Music Chart", "Study Zone", and the like. The terminal may set card stacks corresponding to "Music Chart" and "Study Zone" respectively, classify various cards in "Music Chart" into the corresponding card stack, and classify various cards in "Study Zone" into the corresponding card stack. For unclassified cards "Listen Randomly", "My Music", and "Recent Listens", a new card stack may be defined, and the cards "Listen Randomly", "My Music", and "Recent Listens" are classified into the new card stack.

In this embodiment, the cards belonging to the same category are classified into the same card stack corresponding to the category, so that the corresponding card stack may be quickly defined directly according to the category of the card. The cards that do not belong to a predefined category are collectively classified into the same (i.e., one) card stack to form a card stack of cards that do not belong to any of the predefined categories.

In one embodiment, the aggregation of all cards according to the corresponding card stacks may be superimposing all the card stacks in the same card stack at a preset interval to obtain a target card deck. Alternatively, all the card stacks in the same card stack may be converted into corresponding abbreviated cards, and the abbreviated cards are aggregated to form a target card deck.

In this embodiment, through the voice aggregation operation of the user, all cards in the card stack corresponding to each target card unit specified by the voice aggregation operation are aggregated according to the corresponding card stack, which can quickly aggregate a plurality of cards in the card stack. The user realizes the aggregation of cards through voice, and the operation is fast and simple.

In one embodiment, aggregating at least two target card units to form at least one target card deck includes: superimposing, at a preset interval, the at least two target card units acted on by the aggregation operation, so as to form at least one target card deck.

The preset interval refers to an interval set in advance between card edges on the same side of two cards, for example, an interval between a left edge of a card A and a left edge of a card B, an interval between a right edge of a card A and a right edge of a card B, an interval between an upper edge of a card A and an upper edge of a card B, or an interval between a lower edge of a card A and a lower edge of a card B.

Specifically, the terminal presents a plurality of non-overlapping card units in the card presentation region, and the user may aggregate at least two target card units. In accordance with detecting an aggregation operation of the user, the terminal determines various target card units acted on by the aggregation operation. The terminal superimposes the target card units acted on by the aggregation operation at a preset interval to obtain a target card deck.

In one embodiment, when the at least two target card units include at least one card and at least one card deck, the terminal superimposes the at least one card and the at least one card deck at a preset interval to obtain the target card deck. It is understandable that a superimposing order may be superimposing the card deck on the card, or superimposing the card on the card deck, and the superimposing order between the cards is also similar, which is not excessively limited here.

In one embodiment, after determining the target card units acted on by the aggregation operation, the terminal performs superimposing according to a preset card edge interval on the same side, so that the superimposed cards in the formed target card deck can be partially presented.

For example, when the at least two target card units include a card A and a card B, the terminal may superimpose the card B on the card A, and an interval between a left edge of the card B and a left edge of the card B after superimposing is 1 cm, 2 cam, or 3 cm, etc.

It is understood that each card in the target card deck has the same interval between card edges on the same side with adjacent cards at front and rear.

In this embodiment, in response to the aggregation operation for at least two target card units in the plurality of card units, the at least two target card units acted on by the aggregation operation are superimposed at a preset interval, so that each card in the target card deck formed by superimposing can be partially presented, so as to present a part of information of each card, which is convenient for the user to search.

In one embodiment, superimposing at least two target card units acted on by the aggregation operation at a preset interval to form at least one target card deck includes:
  determining, when an aggregation operation occurs, at least two target card units specified by the aggregation operation; and swiping, in an order from left to right for various cards belonging to the same target card stack in the at least two target card units, a card on a right side to cover a card on a left side at a preset interval to obtain a target card deck corresponding to the corresponding target card stack, so as to finally form at least one target card deck; wherein the card covered at the preset interval in each target card deck displays at most a part of card content.

Specifically, in accordance with detecting an aggregation operation of the user, the terminal determines various target card units acted on by the aggregation operation. The terminal may determine target card stacks to which the target card units acted on by the aggregation operation belong respectively, and swipe, in an order from left to right for cards belonging to the same target card stack in the target card units, a card on a right side to cover a card on a left side at a preset interval, so as to form a target card deck corresponding to the corresponding target card stack. In addition, the cards covered at the preset interval in each target card deck display at most a part of the card content.

In one embodiment, after determining the at least two target card units specified by the aggregation operation, the terminal may swipe, in an order from right to left for cards belonging to the same target card stack in the at least two target card units, a card on a left side to cover a card on a right side at a preset interval to obtain a target card deck corresponding to the corresponding target card stack, so as to finally form at least one target card deck.

In another embodiment, after determining the at least two target card units specified by the aggregation operation, the terminal may swipe, in an order from up to down for cards belonging to the same target card stack in the at least two target card units, a card on a lower side to cover a card on an upper side at a preset interval to obtain a target card deck corresponding to the corresponding target card stack, so as to finally form at least one target card deck.

In other embodiments, after determining the at least two target card units specified by the aggregation operation, the terminal may swipe, in an order from bottom to up for cards belonging to the same target card stack in the at least two target card units, a card on an upper side to cover a card on a lower side at a preset interval to obtain a target card deck corresponding to the corresponding target card stack, so as to finally form at least one target card deck.

In this embodiment, for the cards belonging to the same card stack in the card unit specified by the aggregation operation, a card on a right side is swiped in an order from left to right to cover a card on a left side at a preset interval, so that each card in the target card deck formed by superimposing may be partially presented, so as to present a part of information of each card, which is convenient for the user to search.

Figure 4:
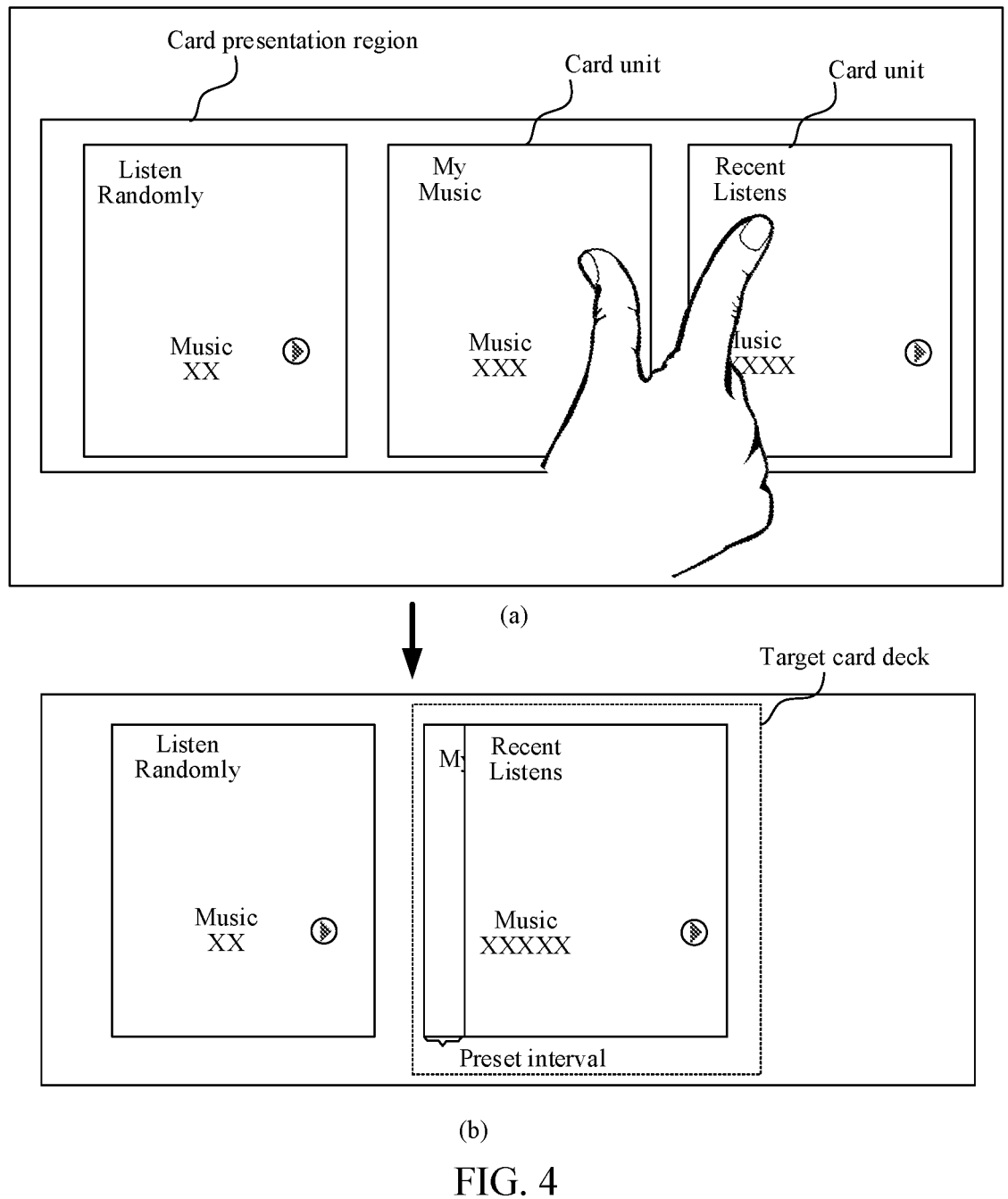
FIG. 4 is a schematic interface diagram of aggregating two card units acted on by a gesture aggregation operation according to one embodiment.

Referring to FIG. 4, a schematic interface diagram of aggregating two card units acted on by a gesture aggregation operation according to one embodiment is shown. In a card presentation region shown in FIG. 4(a), three cards "Listen Randomly", "My Music", and "Recent Listens" are presented. The user aggregates two cards "My Music" and "Recent Listens". In response to the gesture aggregation operation for "My Music" and "Recent Listens", the terminal moves the card "Recent Listens" to the left and superimposes it on the card "My Music", and during superimposing, a preset interval is kept between a left edge of the card "Recent Listens" and a left edge of the card "My Music" to obtain a target card deck shown in FIG. 4(b).

Figure 5:
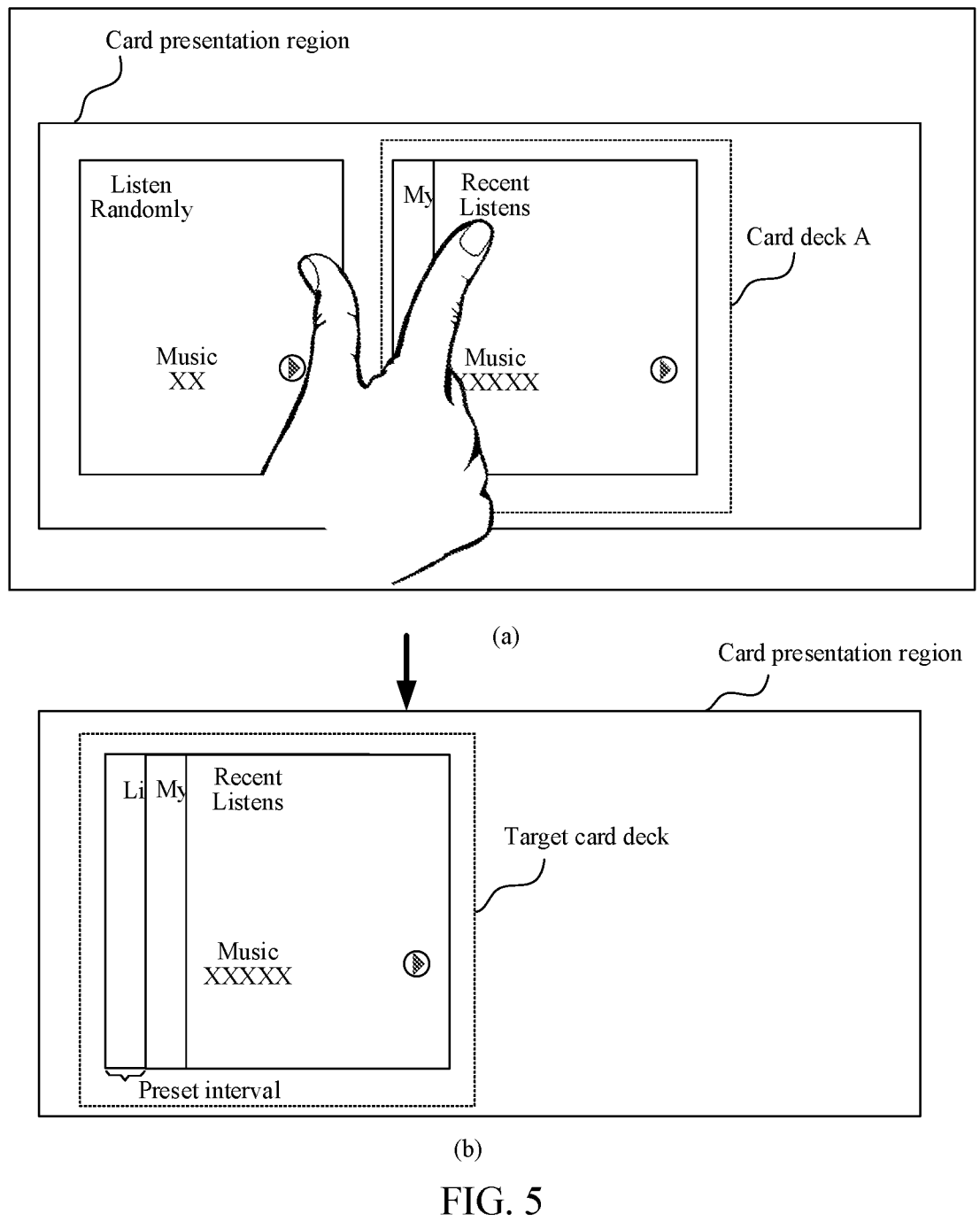
FIG. 5 is a schematic interface diagram of aggregating two card units acted on by a gesture aggregation operation according to another embodiment.

Referring to FIG. 5, a schematic interface diagram of aggregating two card units acted on by a gesture aggregation operation according to one embodiment is shown. In a card presentation region shown in FIG. 5(a), the card "Listen Randomly" and a card deck A are presented, and the user aggregates the card "Listen Randomly" and the card deck A. The terminal moves, in response to the gesture aggregation operation for the card "Listen Randomly" and the card deck A, the card deck A to the left and superimposes it on the card "Listen Randomly", and during superimposing, a preset interval is kept between a left edge of the card "Listen Randomly" and a left edge of the card "My Music" in the card deck A, so as to obtain a target card deck shown in FIG. 5(b). A preset interval is kept between left edges of any two adjacent cards in the target card deck, that is, a preset interval is also kept between the left edge of the card "Recent Listens" and the left edge of the card "My Music" in the target card deck.

In one embodiment, aggregating at least two target card units to form at least one target card deck includes: converting each card unit of the at least two target card units acted on by the aggregation operation into a corresponding abbreviated card unit, and aggregating the abbreviated card units to form at least one target card deck.

Specifically, the terminal presents a plurality of non-overlapping card units in the card presentation region, and the user may aggregate at least two target card units. In accordance with detecting an aggregation operation of the user, the terminal determines various target card units acted on by the aggregation operation. The terminal converts each card unit in the target card units acted on by the aggregation operation into a corresponding abbreviated card unit, respectively. The terminal aggregates the various abbreviated card units to obtain a target card deck.

In one embodiment, the terminal determines various target card units acted on by the aggregation operation. When the target card unit is a single card, the target card unit is converted into a corresponding abbreviated card, and the abbreviated card is used as a corresponding abbreviated card unit. When the target card unit is a card deck, the abbreviated card unit corresponding to the card deck includes an abbreviated card corresponding to each card in the card deck.

In this embodiment, in response to an aggregation operation for at least two target card units in a plurality of card units, the card units acted on by the aggregation operation are converted into corresponding abbreviated card units, so that the card units may be presented in an abbreviated form, and the card units occupy a smaller display area. By aggregating the abbreviated card units, the associated cards can be classified into the same deck, which is convenient for the user to search for a required card.

In an embodiment, the method further includes: dynamically adjusting, along with a reduction of a display area occupied by the target card deck formed by aggregation, an arrangement layout of card units accommodated in the card presentation region.

Specifically, the card presentation region accommodates a preset quantity of card units. In a process of the terminal aggregating at least two target card units in the card presentation region, as the at least two target card units are aggregated, the display area occupied by the at least two target card units in the presentation region is gradually reduced. Along with the reduction of the display area occupied by the target card deck formed by aggregation, the terminal dynamically adjusts the arrangement layout of the card units accommodated in the card presentation region, so as to present more cards in the card presentation region.

In this embodiment, along with the reduction of the display area occupied by the target card deck formed by aggregation, the arrangement layout of the presented card units is dynamically adjusted, so that the aggregation of cards and the dynamic adjustment of the presentation area of the cards may be simultaneously achieved through the aggregation operation of the user, and the operation is simple.

In an embodiment, dynamically adjusting, along with a reduction of a display area occupied by the target card deck formed by aggregation, an arrangement layout of card units accommodated in the card presentation region includes:

moving, along with the reduction of the display area occupied by the target card deck formed by aggregation, card units originally accommodated in the card presentation region so that the card units are arranged adjacently in sequence, and presenting, in a process of moving the originally accommodated card units, at least one subsequent card unit adjacently in an idle position of the card presentation region, so as to dynamically adjust the arrangement layout of the card units currently accommodated in the card presentation region.

Specifically, in the process that the at least two target card units are aggregated to form a target card deck, the display area occupied by the at least two target card units is gradually reduced. The terminal moves the card units originally accommodated in the card presentation region, so that the target card deck formed by aggregation and the card units are arranged adjacently in sequence. In the process of moving the originally accommodated card units, at least one subsequent card unit is presented adjacently in an idle position of the card presentation region, so as to realize the dynamic adjustment of the arrangement layout of the currently accommodated card units in the card presentation region, thus forming the arrangement layout of the currently accommodated card units.

In accordance with aggregating the card units to form the target card deck, the display area occupied by the formed target card deck is smaller than the total display area occupied when the card units are presented without overlapping each other. Therefore, in the process of forming the target card deck by aggregation, an idle position can be vacated in the card presentation region, and the idle position is used for displaying at least one subsequent card unit, so that more card units can be presented in the card presentation region. The card units presented in the card presentation region are arranged adjacently in sequence. In the process of aggregating the card units to form the target card deck, the card units originally accommodated in the card presentation region are dynamically adjusted with the formation of the target card deck, so that the card units are still arranged adjacent to each other.

In one embodiment, the at least one subsequent card unit includes at least one of: a single card or a card deck. Along with the reduction of the display area occupied by the target card deck formed by aggregation, an idle position appears in the card presentation region. When the idle position is enough to accommodate one card unit, the subsequent next card unit is presented in the idle position. When the idle position is enough to accommodate two card units, the subsequent two card units are presented in the idle position, and so on. Further, when the subsequent next card unit is a single card, the single card is presented in the idle position, and when the subsequent next card unit is a card deck, the card deck is presented in the idle position, and so on.

In one embodiment, when the idle position of the card presentation region is not enough to accommodate one card unit, a part of one card unit may be presented in the idle position. For example, if the subsequent next card unit is a single card, and the idle position is not enough to accommodate the single card, but can only accommodate half a card, the half card may be presented in the idle position.

In one embodiment, the terminal may preset a presentation order for various cards, so that the cards can be presented in the card presentation region according to the presentation order. In the process of moving the originally accommodated card units, the terminal may determine at least the next subsequent card unit through the presentation order of the cards in the originally accommodated card units in the card presentation region, so as to present at least the subsequent next card unit in the idle position.

In this embodiment, along with the reduction of the display area occupied by the target card deck formed by aggregation, an idle position can be vacated in the card presentation region, and the idle position is used for displaying at least one subsequent card unit, so that the card presentation region can show more card units. In the process of aggregating various card units to form the target card deck, the card units originally accommodated in the card presentation region are automatically and dynamically adjusted along with the formation of the target card deck, so that the card units are still arranged adjacent to each other to avoid a subsequently presented card unit from being interspersed and presented between the originally accommodated card units, so that the boundary between the originally presented card unit and the subsequently presented card unit is clear, the display is more intuitive, and it is more convenient for the user to search for information.

Figure 6:
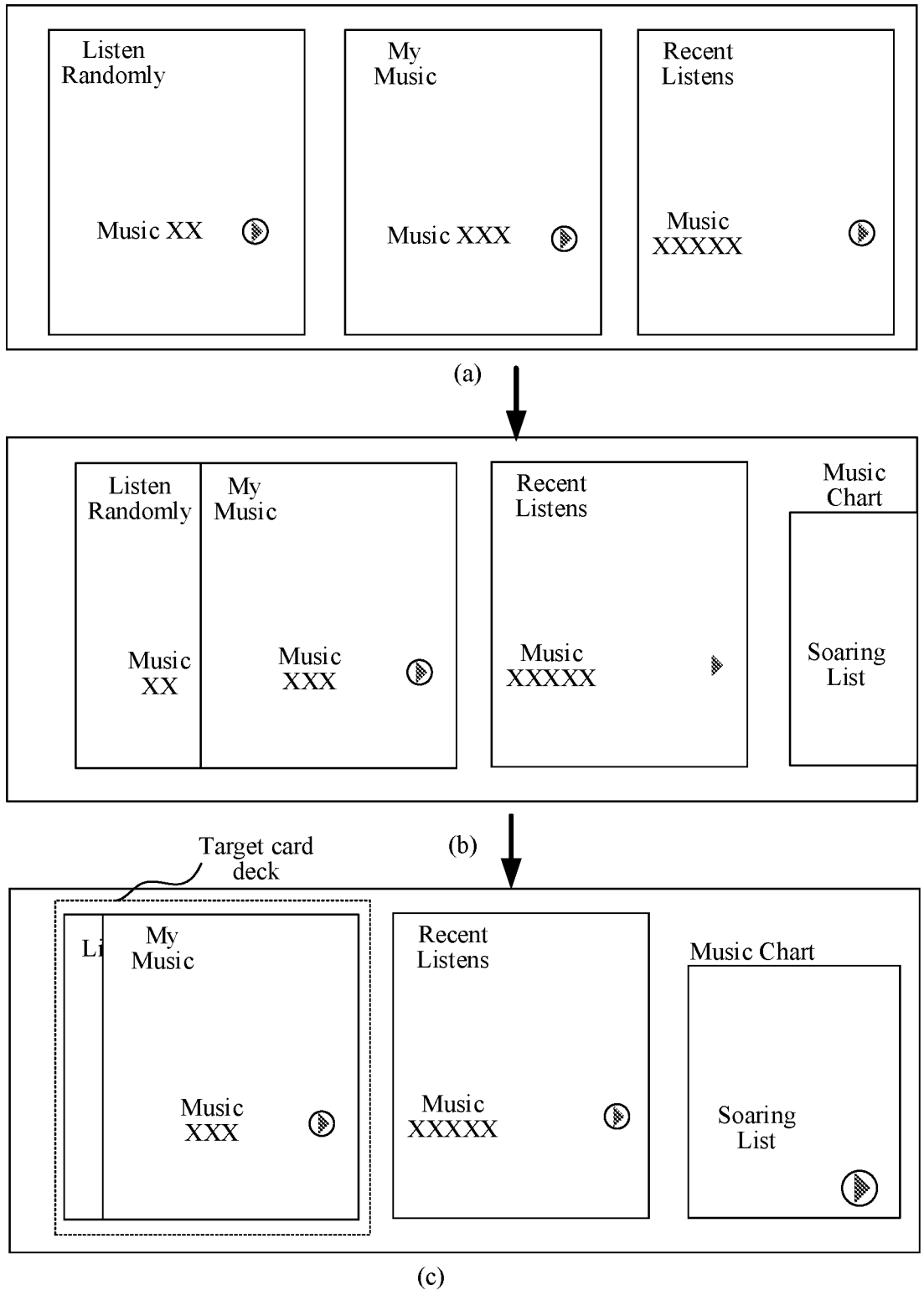
FIG. 6 is a schematic interface diagram of dynamically adjusting an arrangement layout of card units accommodated in a card presentation region in accordance with forming a target card deck by aggregation according to one embodiment.

Referring to FIG. 6, a schematic interface diagram of dynamically adjusting an arrangement layout of card units accommodated in a card presentation region along with a reduction of a display area occupied by a target card deck formed by aggregation according to one embodiment is shown. In the card presentation region shown in FIG. 6(a), three cards "Listen Randomly", "My Music", and "Recent Listens" are presented. The user aggregates the two cards "Listen Randomly" and "My Music". In response to the aggregation operation for "Listen Randomly" and "My Music", the terminal moves the card "My Music" to the left and superimposes it on the card "Listen Randomly". With the aggregation of "Listen Randomly" and "My Music", the terminal moves the card "Recent Listens" originally accommodated in the card presentation region, so that a target card deck formed by the aggregation of "Listen Randomly" and "My Music" and the card "Recent Listens" are arranged adjacent to each other in sequence. Moreover, in the process of aggregation, at least one subsequent card unit is gradually presented, such as a card "Soaring List" shown in FIG. 6(b). In the process of moving the card "Recent Listens", at least one subsequent card unit is presented adjacently in the idle position of the card presentation region, that is, the card "Soaring List" is presented in the idle position, as shown in FIG. 6(c).

In an embodiment, the method further includes: spreading, in response to a spreading operation for a card deck in the card presentation region, the card deck corresponding to the spreading operation to form at least two non-overlapping card units; and dynamically adjusting, along with an increase of a display area occupied by the at least two card units formed by spreading, an arrangement layout of the card units accommodated in the card presentation region.

The spreading operation is a preset operation of spreading at least two card units, and the arbitrary operation includes but is not limited to a gesture spreading operation, a voice spreading operation, a cursor spreading operation, a key spreading operation, and the like. The gesture spreading operation may include at least one of a swipe gesture spreading operation, an air gesture spreading operation, a click/tap gesture spreading operation, or a press gesture spreading operation. The swipe gesture spreading operation may specifically be a single-point swipe-to-spread operation or a multi-point swipe-to-spread operation, and the swipe gesture spreading operation is a contact gesture spreading operation. The air gesture spreading operation refers to a non-contact gesture spreading operation, and may specifically refer to that there is a preset distance between an air gesture and an object acted on by the air gesture, or a distance between the two is within a preset distance range. The click/tap gesture spreading operation may specifically be a single-point touch-to-spread operation, a multi-point touch-to-spread operation, or the like. The press gesture spreading operation may specifically be a single-point press-to-spread operation, a multi-point press-to-spread operation, or the like. The cursor spreading operation may be an operation of controlling a cursor for performing any one of click/tap, double-click/tap, press, or swipe to perform spreading. The key spreading operation may be a virtual key spreading operation, a physical key operation, or the like. This is not limited.

Specifically, the user may spread a card deck presented in the card presentation region. In response to a spreading operation for a card deck in the card presentation region, the terminal determines the card deck acted on by the spreading operation, and spreads the card deck corresponding to the spreading operation to form at least two non-overlapping card units, so as to present the at least two card units in the card presentation region. The at least two card units include at least one of a single card or a card deck. The card deck acted on by the spreading operation is the card deck corresponding to the spreading operation.

The card presentation region accommodates a preset quantity of card units. In the process that the terminal spreads the card deck in the card presentation region into at least two card units, the display area occupied by the card units formed in the presentation region is gradually increased along with the spreading of the target card deck, and the terminal dynamically adjusts the arrangement layout of the card units accommodated in the card presentation region until the at least two card units are non-overlapping in the card presentation region.

In one embodiment, dynamically adjusting, along with an increase of a display area occupied by the at least two card units formed by spreading, an arrangement layout of card units accommodated in the card presentation region includes:

moving, along with the increase of the display area occupied by the at least two card units formed by spreading, the card units originally accommodated in the card presentation region so that the card units are arranged adjacent to each other in sequence, and removing, in the process of moving the originally accommodated card units, at least one card unit of the originally accommodated card units from the card presentation region, so as to dynamically adjust the arrangement layout of the card units currently accommodated in the card presentation region.

When the card deck is spread to form at least two card units, and the display area occupied by the formed at least two card units is greater than the total display area occupied by the card deck, the originally accommodated card units cannot be completely presented in the process of forming the at least two card units; therefore, the terminal removes at least one card unit from the originally accommodated card units, so that at least two card units formed by spreading the card deck can be tiled and presented in the card presentation region, thereby realizing the dynamic adjustment of the arrangement layout of the card units currently accommodated in the card presentation region.

In one embodiment, along with the increase of the display area occupied by the at least two card units formed by spreading, the card units originally accommodated in the card presentation region cannot be completely presented, and at least a part of at least one card unit in the originally accommodated card units needs to be removed from the card presentation region, and in the process of spreading the card deck to form at least two card units, at least a part of the at least one card unit is gradually removed from the card presentation region until the spread card deck forms at least two non-overlapping card units.

In one embodiment, the at least two card unit includes at least two cards. In response to a spreading operation for a card deck in the card presentation region, the terminal spreads the card deck corresponding to the spreading operation to form at least two non-overlapping cards.

In one embodiment, the at least two card units include at least one card and at least one card deck. In response to a spreading operation for a single card deck in the card presentation region, the terminal spreads the single card deck corresponding to the spreading operation to form at least one card and at least one card deck. The at least one card and the at least one card deck are non-overlapping.

In one embodiment, the at least two card units include at least two card decks. In response to a spreading operation for a single card deck in the card presentation region, the terminal spreads the single card deck corresponding to the spreading operation to form at least two non-overlapping card decks.

In this embodiment, in response to the spreading operation of the user for the card deck in the card presentation region, the card deck corresponding to the spreading operation is spread to form at least two non-overlapping card units, so that the card deck can be spread to facilitate the user to view detailed information of cards in the card deck. Along with an increase of a display area occupied by the at least two card units formed by spreading, the arrangement layout of the card units accommodated in the card presentation region is dynamically adjusted, so that the card units presented in the card presentation region are still non-overlapping, which is convenient for the user to search for card information.

In one embodiment, the spreading operation includes a gesture spreading operation; and spreading, in response to a spreading operation for a card deck in the card presentation region, the card deck corresponding to the spreading operation to form at least two non-overlapping card units includes:

tiling and presenting, in response to a gesture spreading operation for at least one card in the card deck, the at least one card specified by the gesture spreading operation in the card presentation region, so as to form the card deck into at least two non-overlapping card units.

The tiling and presenting refers to that the card units are completely presented in the card presentation region. When the card unit is a single card, the tiling and presenting of the single card refers to that the single card is completely presented in the card presentation region. When the card unit is a card deck, the tiling and presenting of the card deck refers to that the card deck, regarded as a whole, is completely presented in the card presentation region, and cards in the card deck still exist in an aggregated form.

Specifically, the spreading operation includes a gesture spreading operation. The terminal presents at least one card deck in the card presentation region, and the user may spread at least one card in the card deck through a gesture. In accordance with detecting a gesture spreading operation of the user, the terminal determines a card in the card deck acted on by the gesture aggregation operation, moves the card acted on by the gesture aggregation operation out from the card deck, and tiles and presents it in the card presentation region. The tiled and presented card is used as a card unit, and other cards in the card deck except the tiled and presented card are used as a card unit, so that two card units are obtained.

In one embodiment, when there are two cards in the card deck, in response to a gesture spreading operation for at least one card in the card deck, the two cards in the card deck are tiled and presented to obtain two card units.

In this embodiment, in response to the gesture spreading operation of the user for at least one card in the presented card deck, at least one card specified by the gesture spreading operation is tiled and presented, so that a single card can be moved out from the card deck based on the gesture operation of the user and completely presented to the user, so that detailed information of the card may be displayed intuitively for the user to view. The cards in the card deck that the user does not need to view still exist in the form of a card deck, thereby reducing the occupation of the display area.

Figure 7:
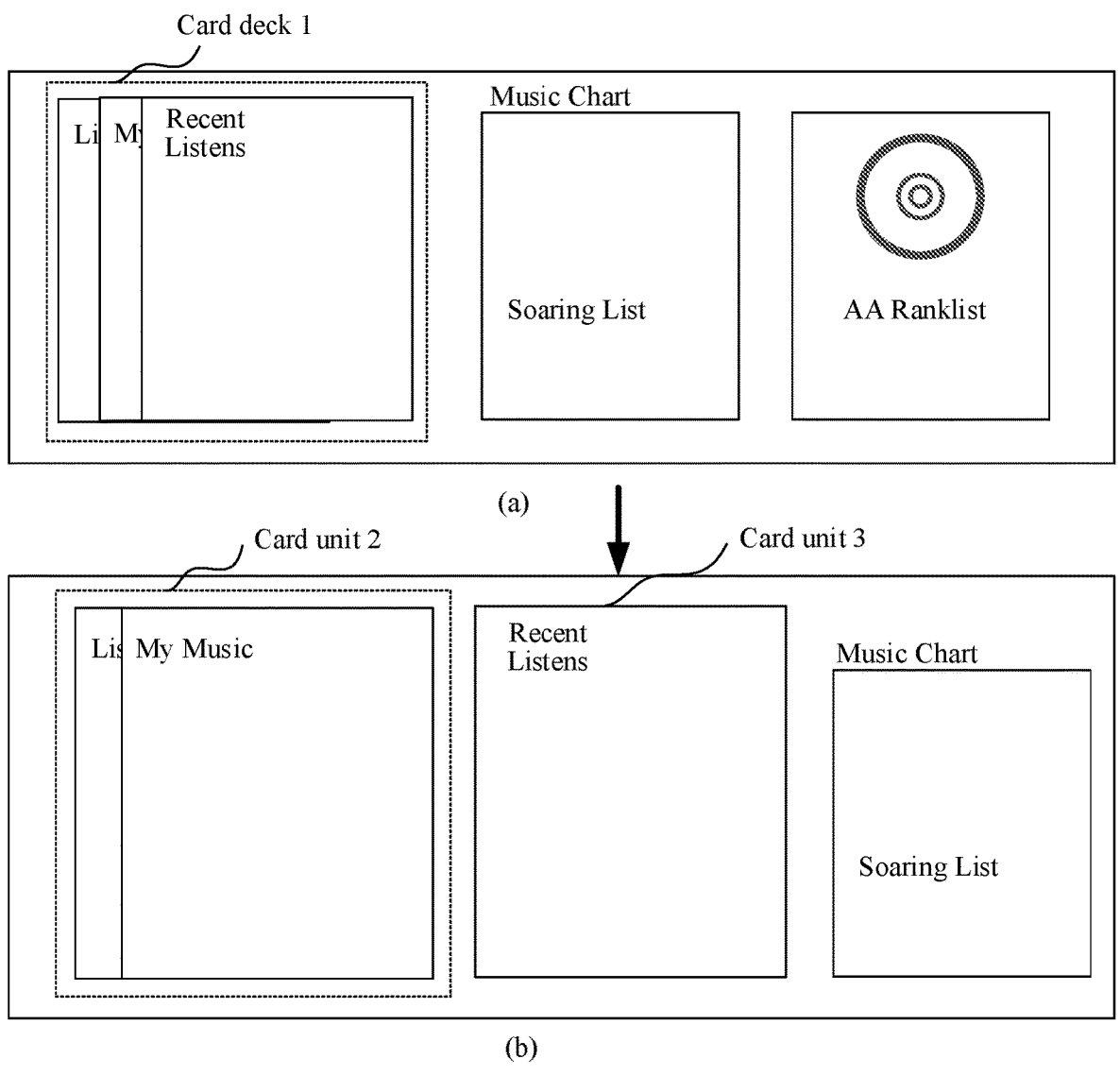
FIG. 7 is a schematic interface diagram of spreading a card deck to form two card units through a gesture spreading operation according to one embodiment.

As shown in FIG. 7(a), a card deck 1, a card "Soaring List", and a card "AA Ranklist" that are non-overlapping are presented in a card presentation region. The card deck 1 includes three overlapping cards: Listen Randomly, My Music, and Recent Listens. The user spreads the card "Recent Listens" in the card deck 1 through a gesture spreading operation, and the terminal moves, in response to the gesture spreading operation, the card "Recent Listens" out from the card deck 1 and tiles and presents it in the card presentation region, so as to form two card units, that is, a card unit 2 and a card unit 3 that are non-overlapping as shown in FIG. 7(b).

In a process of spreading the card "Recent Listens", the arrangement layout of the card units accommodated in the card presentation region is dynamically adjusted as a display area occupied by the card unit 2 and the card unit 3 is increased, that is, the arrangement of the card unit 2, the card unit 3, the card "Soaring List", and the card "AA Ranklist" is adjusted, and the card "AA Ranklist" is moved out from the card presentation region.

In one embodiment, the gesture spreading operation includes a swipe gesture spreading operation, the method further includes:
 determining, when a swipe gesture spreading operation occurs, a swipe-to-spread distance and a swipe-to-spread speed of the swipe gesture spreading operation acting on at least one card; and performing, when at least one of the swipe-to-spread distance or the swipe-to-spread speed meets a spreading condition, the step of responding to the gesture spreading operation for at least one card in the card deck.

The spreading condition refers to a condition for spreading each target card unit into a target card deck. Specifically, the spreading condition may be at least one of a swipe-to-spread distance being greater than a spread distance threshold or the swipe-to-spread speed being greater than a spread speed threshold. The swipe-to-spread distance refers to a distance generated by a swipe-to-spread gesture acted on a card due to the swipe. The swipe-to-spread speed refers to a speed of the swipe-to-spread gesture acted on the card during swiping.

Specifically, the gesture spreading operation includes a swipe gesture spreading operation. The terminal presents at least one card deck in the card presentation region, and the user may spread at least one card in the card deck through a swipe gesture. The terminal determines, in response to a swipe gesture spreading operation for at least one card in the card deck, cards acted on by the swipe gesture spreading operation.

The terminal detects the swipe-to-spread distance and the swipe-to-spread speed corresponding to the swipe gesture spreading operation on each card. When at least one of the swipe-to-spread distance or the swipe-to-spread speed meets the spreading condition, the terminal, in response to the swipe gesture spreading operation for at least one card in the card deck, tiles and presents the at least one card specified by the swipe gesture spreading operation, so as to form the card deck into at least two non-overlapping card units.

In this embodiment, the terminal may detect the swipe-to-spread distance and swipe-to-spread speed generated by the swipe gesture spreading operation acting on the card, and use the generated swipe-to-spread distance and swipe-to-spread speed as the swipe-to-spread distance and swipe-to-spread speed corresponding to the card.

In one embodiment, performing, when at least one of the swipe-to-spread distance or the swipe-to-spread speed meets the spreading condition, the step of responding to the gesture spreading operation for at least one card in the card deck includes: performing, when there is at least one of the swipe-to-spread distance being greater than the spread distance threshold or the swipe-to-spread speed being greater than the spread speed threshold, the step of responding to the gesture spreading operation for at least one card in the card deck.

Specifically, for each card acted on by the swipe gesture spreading operation, the terminal determines the swipe-to-spread distance and the swipe-to-spread speed corresponding to the swipe gesture spreading operation on each card. When the swipe-to-spread distances corresponding to the cards are greater than the spread distance threshold, the cards acted on by the swipe gesture spreading operation are tiled and presented, and the tiled and presented cards are non-overlapping.

When the swipe-to-spread speeds corresponding to the cards are greater than the spread speed threshold, the cards acted on by the swipe gesture spreading operation are tiled and presented.

When the swipe-to-spread distances corresponding to the cards are greater than the spread distance threshold, and the swipe-to-spread speeds corresponding to the cards are greater than the spread speed threshold, the cards acted on by the swipe gesture spreading operation are tiled and presented.

In other embodiments, when at least one swipe-to-spread distance in the swipe-to-spread distances corresponding to the cards is greater than the spread distance threshold, the cards acted on by the swipe gesture spreading operation are tiled and presented.

When there is at least one swipe-to-spread speed of the swipe-to-spread speeds corresponding to the cards that is greater than the spread speed threshold, the cards acted on by the swipe gesture spreading operation are tiled and presented.

When at least one swipe-to-spread distance in the swipe-to-spread distances corresponding to the cards is greater than the spread distance threshold, and there is at least one swipe-to-spread speed of the swipe-to-spread speeds corresponding to the cards that is greater than the spread speed threshold, the cards acted on by the swipe gesture spreading operation are tiled and presented.

In this embodiment, when a swipe gesture spreading operation occurs, the swipe-to-spread distance and the swipe-to-spread speed of the swipe gesture spreading operation acting on at least one card are determined, and the swipe-to-aggregate distance and/or the swipe-to-aggregate speed are used as conditions for determining whether to spread the cards in the card deck. In some embodiments, the cards are spread only when at least one of the swipe-to-aggregate distance or the swipe-to-aggregate speed meets the spreading condition, so as to avoid misinterpretation of the user's interactions, thus improving the accuracy of card spreading.

In one embodiment, the gesture spreading operation includes an air gesture spreading operation. The method further includes:
    mapping, when an air gesture spreading operation occurs, the air gesture spreading operation to the card presentation region to determine at least one card in the card deck acted on by the air gesture spreading operation; determining a move-to-spread distance and a move-to-spread speed corresponding to the air gesture spreading operation acting on the at least one card; and performing, when at least one of the move-to-spread distance or the move-to-spread speed meets a spreading condition, the step of responding to the gesture spreading operation for at least one card in the card deck.

The spreading condition refers to a condition for spreading each target card unit into a target card deck. Specifically, the spreading condition may be at least one of the move-to-spread distance is greater than a spread distance threshold or the move-to-spread speed is greater than a spread speed threshold. The move-to-spread distance refers to a distance generated by an air spreading gesture acting on a card due to moving. The move-to-spread speed refers to a speed of the air spreading gesture acting on the card during moving.

Specifically, the gesture spreading operation includes an air gesture spreading operation. The terminal presents at least one card deck in the card presentation region, and the user may spread at least one card in the card deck through an air gesture. The terminal determines, in response to an air gesture spreading operation for at least one card in the card deck, cards acted on by the air gesture spreading operation. The terminal detects a move-to-spread distance and a move-to-spread speed corresponding to the air gesture spreading operation on each card.

In this embodiment, the terminal may detect the move-to-spread distance and the move-to-spread speed generated by the air gesture spreading operation acted on a target card unit, and use the generated move-to-spread distance and move-to-spread speed as the move-to-spread distance and move-to-spread speed corresponding to the target card unit.

When at least one of the move-to-spread distance or the move-to-spread speed meets the spreading condition, the terminal tiles and presents, in response to an air gesture spreading operation for at least one card in the card deck, the at least one card specified by the air gesture spreading operation, so as to form the card deck into at least two non-overlapping card units.

In one embodiment, the terminal may detect a gesture operation of the user, and when a distance between the gesture operation of the user and the card presentation region is within a preset distance range, it is further detected whether the gesture operation matches a preset gesture spreading operation. When the distance between the gesture operation and the card presentation region is within the preset distance range, and the gesture operation matches the preset gesture spreading operation, it is determined that the gesture operation is an air gesture spreading operation. Next, the terminal may map the air gesture operation to the card presentation region to determine at least two target card units acted on by the air gesture spreading operation.

The terminal may detect feature points of the air gesture spreading operation, and map the feature points to the card presentation region, so as to determine the target card unit acted on by the air gesture spreading operation according to the feature points.

In one embodiment, performing, when at least one of the move-to-spread distance or the move-to-spread speed meets a spreading condition, the step of responding to the gesture spreading operation for at least one card in the card deck includes: performing, when there is at least one of the move-to-spread distance being greater than the spread distance threshold or the move-to-spread speed being greater than the spread speed threshold, the step of responding to the gesture spreading operation for at least one card in the card deck.

Specifically, for each card acted on by the air gesture spreading operation, the terminal determines the move-to-spread distance and/or the move-to-spread speed corresponding to the air gesture spreading operation on each card. When the move-to-spread distances corresponding to the cards are greater than the spread distance threshold, the cards acted on by the air gesture spreading operation are tiled and presented, and the tiled and presented cards are non-overlapping.

When the move-to-spread speeds corresponding to the cards are greater than the spread speed threshold, the cards acted on by the air gesture spreading operation are tiled and presented.

When the move-to-spread distances corresponding to the cards are greater than the spread distance threshold, and the move-to-spread speeds corresponding to the cards are greater than the spread speed threshold, the cards acted on by the air gesture spreading operation are tiled and presented.

In other embodiments, when there is at least one move-to-spread distance in the move-to-spread distances corresponding to the cards that is greater than the spread distance threshold, the cards acted on by the air gesture spreading operation are tiled and presented.

When there is at least one move-to-spread speed in the move-to-spread speeds corresponding to the cards that is greater than the spread speed threshold, the cards acted on by the air gesture spreading operation are tiled and presented.

When there is at least one move-to-spread distance in the move-to-spread distances corresponding to the cards that is greater than the spread distance threshold, and there is at least one move-to-spread speed in the move-to-spread speeds corresponding to the cards is greater than the spread speed threshold, the cards acted on by the air gesture spreading operation are tiled and presented.

In this embodiment, when an air gesture spreading operation occurs, the move-to-spread distance and/or the move-to-spread speed of the air gesture spreading operation acting on at least one card are determined, and the move-to-aggregate distance and/or the move-to-aggregate speed are used as conditions for judging whether to spread the cards in the card deck. The cards are spread only when at least one of the move-to-aggregate distance or the move-to-aggregate speed meets the spreading condition, which can avoid misinterpretation of the user's gesture and improve the accuracy of card spreading. In addition, the card in the card deck may be spread through the air gesture spreading operation, so that the user can realize the spreading of the card without directly touching the card presentation region, so as to meet requirements of users in different scenarios.

Figure 8:
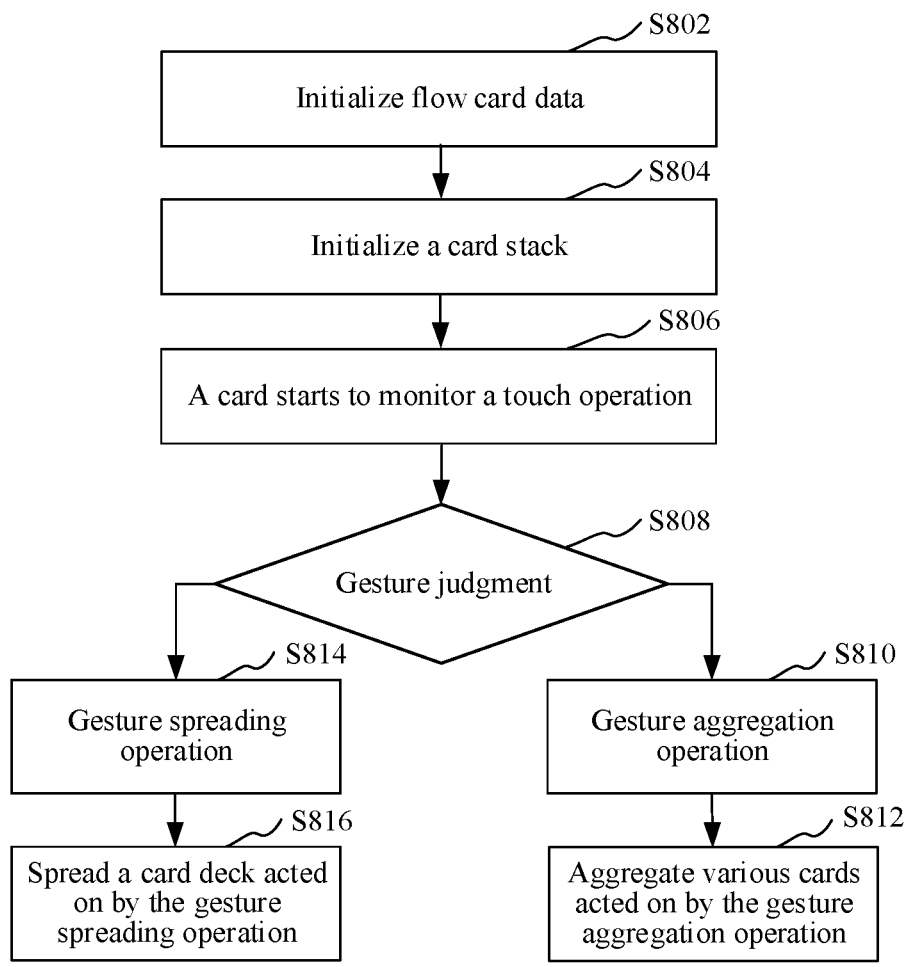
FIG. 8 is a schematic flowchart of a card unit presentation method according to one embodiment.

FIG. 8 is a schematic flowchart of a card unit presentation method according to one embodiment. A user runs an application through a terminal to display a card presentation region on an application interface, thereby performing step S802.

Step S802: Acquire, by the terminal, flow card data from a server, and initialize the acquired flow card data to form a card stack, the card stack including various associated cards, and then perform step S804.

Step S804: Initialize the card stack by the terminal, that is, present card units in at least one card stack in the card presentation region, the card units presented in the card presentation region being non-overlapping. The card unit may be a single card, or a card deck formed by aggregating a plurality of cards.

Next, step S806 is performed, in which the card units in the card presentation region start to monitor a gesture touch operation of the user. When a gesture judgment of the user is monitored, step S808 is performed.

Step S808: Judge a touch gesture of the user to determine whether the touch gesture is a gesture aggregation operation in step S810 or a gesture spreading operation in step S814.

When the touch gesture is the gesture aggregation operation in step S810, step S812 is performed, that is, at least two card units acted on by the gesture aggregation operation are determined, and the at least two card units are aggregated to form a target card deck.

For example, the terminal detects a touch gesture of the user on two card units, and the touch gesture swipes the left card unit of the two card units to the right, and swipes the right card unit of the two card units to the left. The terminal may use an Application Programming Interface (API) of a VelocityTracker system to calculate a swipe speed. When a swipe distance of a left contact in the left card unit to the right is greater than a distance threshold and a swipe speed is greater than a speed threshold, and that a swipe distance of a right contact in the right card unit to the left is greater than the distance threshold and a swipe speed is greater than the speed threshold, it is judged that the touch gesture is a gesture aggregation operation. For example, the swipe distance is greater than 20 dp (padding), and the swipe speed is greater than 2 cm/sec. A capping interval of each card after aggregation may be 100 dp, so as to form a target card deck.

The swipe speed is judged as follows:
VelocityTracker
   mVelocityTracker=VelocityTracker.obtain( )
mVelocityTracker.addMovement(ev);
mVelocityTracker.computeCurrentVelocity(1000);
float xVelocity=mVelocityTracker.getXVelocity( );//velocity When the touch gesture is the gesture spreading operation in step S814, step S816 is performed, that is, a card deck acted on by the gesture spreading operation is determined, and the card deck is spread into at least two card units.

For example, the terminal detects a touch gesture of the user on a card deck, and the touch gesture swipes one card in the card deck to the right. When a swipe distance or a swipe speed is greater than a corresponding threshold, such as 20 dp, it is judged as a gesture spreading operation.

In one embodiment, the spreading operation is a voice spreading operation; and spreading, in response to a spreading operation for a card deck in the card presentation region, the card deck corresponding to the spreading operation to form at least two non-overlapping card units includes:
   tiling and presenting, in response to a voice spreading operation for a card deck in the card presentation region, at least one card in the card deck acted on by the voice spreading operation to spread the card deck to form at least two non-overlapping card units.

Specifically, the terminal presents at least one card deck in the card presentation region, and the user may spread the card deck through a voice spreading operation. In accordance with detecting a voice spreading operation of the user, the terminal determines the card deck acted on by the voice spreading operation, and tiles and presents cards in the card deck acted on by the voice spreading operation in the card presentation region. The terminal may detect a preset quantity of non-overlapping cards that can be accommodated in the card presentation region, and determine a quantity of the cards in the card deck acted on by the voice spreading operation. When the quantity of the cards in the card deck is less than or equal to the preset quantity, all cards in the card deck are tiled and presented in the card presentation region. When the quantity of the cards in the card deck is greater than the preset quantity, a preset quantity of cards are selected from the card deck for being tiled and presented in the card presentation region.

In one embodiment, when the quantity of the cards in the card deck is greater than the preset quantity, the cards in the card deck are tiled and presented in the card presentation region according to a presentation order, and the quantity of the cards tiled and presented is the same as the preset quantity of the cards accommodated in the card presentation region. The presentation order refers to sorting of the cards in the card deck. For example, the presentation order of cards A, B, C, and D in the card deck is 1, 2, 3, and 4, respectively. When the preset quantity is 3, the cards A, B, and C are tiled and presented in the card presentation region according to the presentation order.

In one embodiment, the spreading operation is a voice spreading operation; and spreading, in response to a spreading operation for a card deck in the card presentation region, the card deck corresponding to the spreading operation to form at least two non-overlapping card units includes:
   tiling and presenting, in response to a voice spreading operation for a card deck in the card presentation region, all cards in the card deck acted on by the voice spreading operation, the tiled and presented cards being non-overlapping.

Specifically, the spreading operation is a voice spreading operation, and the voice spreading operation refers to an operation of tiling and presenting all cards in the card deck by voice. The terminal presents at least one card deck in the card presentation region, and the user may spread the card deck through a voice spreading operation. In accordance with detecting a voice spreading operation of the user, the terminal determines the card deck acted on by the voice spreading operation, and tiles and presents all cards in the card deck acted on by the voice spreading operation in the card presentation region. The tiled and presented cards are non-overlapping.

For example, when the terminal detects a voice spreading operation of the user for a card deck A in the card presentation region, all cards in the card deck A are tiled and presented.

In one embodiment, in response to a voice spreading operation for at least two card decks in the card presentation region, all cards in the at least two card decks acted on by the voice spreading operation are tiled and presented, and the tile presented cards are non-overlapping.

In this embodiment, through the voice spreading operation of the user, all cards in the card deck specified by the voice spreading operation are tiled and presented in the card presentation region, so that the user can realize the spreading of the cards in the card deck through the voice, and the operation is fast and simple.

In one embodiment, the method is performed by a vehicle-mounted terminal, the card presentation region is a presentation region provided by a display screen of the vehicle-mounted terminal, and the card is provided by at least one vehicle-mounted application running on the vehicle-mounted terminal.

Figure 9:
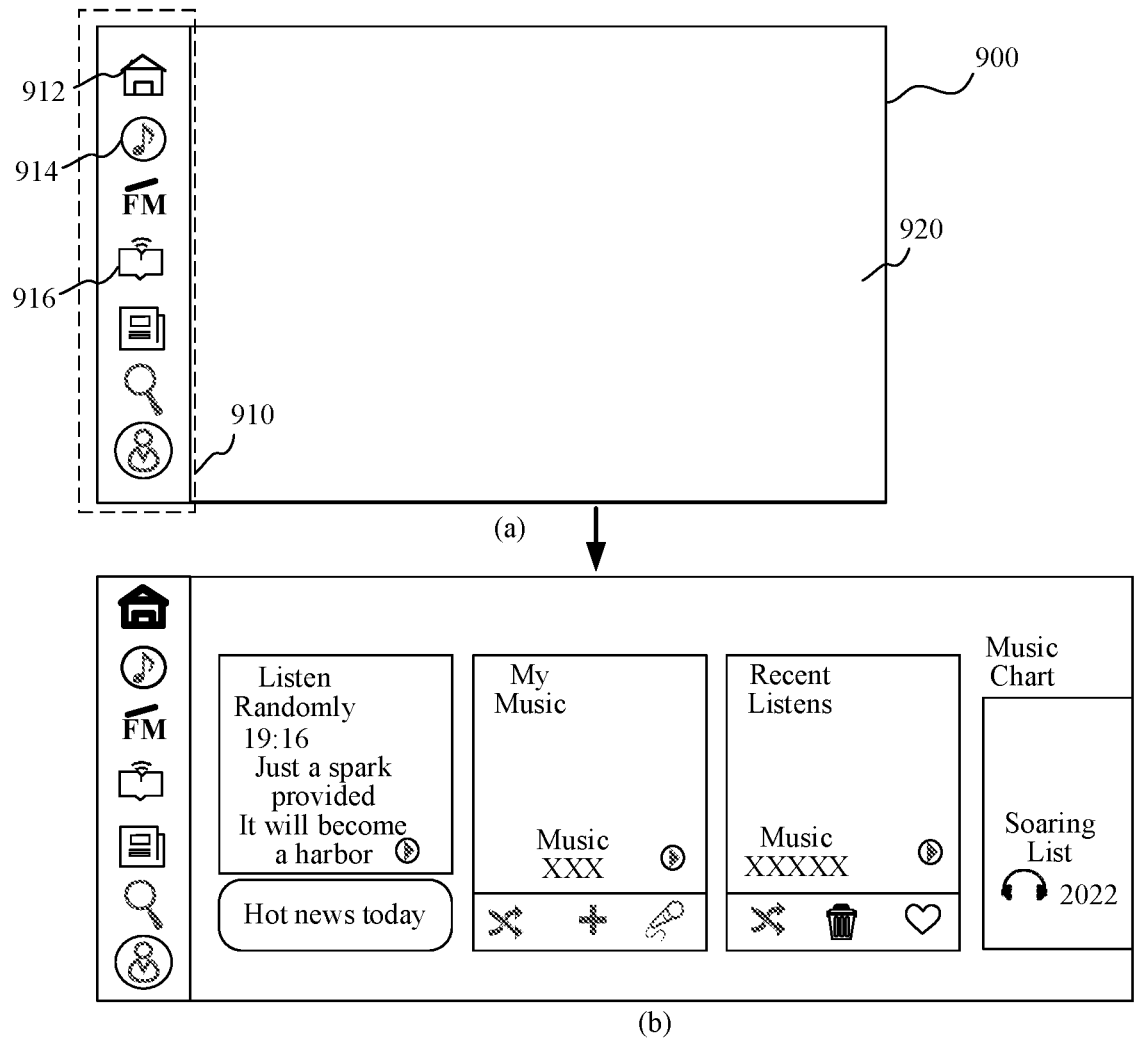
FIG. 9 is a schematic diagram of a page of a vehicle-mounted application presented on a vehicle-mounted terminal according to one embodiment.

Specifically, the vehicle-mounted application runs on the vehicle-mounted terminal. A display screen 900 of the vehicle-mounted terminal provides an icon presentation region 910 and a presentation region 920 for relevant data of various vehicle-mounted applications. The icon presentation region 910 presents a homepage icon and application icons of various vehicle-mounted applications, such as a homepage icon 912, a music application icon 914, and an e-book application icon 916, as shown in FIG. 9(*a*).

When the home page icon 912 is in a selected state, the vehicle-mounted terminal presents data of at least one vehicle-mounted application in the presentation region 920, and the data of each vehicle-mounted application is presented in the form of a card. As shown in FIG. 9(*b*), in the presentation region 920, contents of a card "Listen Randomly", a card "My Music", a card "Recent Listens", a card "Soaring List", and the like in a music application corresponding to the music application icon 914 are partially presented. The cards presented in the presentation region 920 are non-overlapping. Display areas occupied by the cards in the presentation region 920 may be the same or different.

The vehicle-mounted terminal defines different card stacks for various cards in the vehicle-mounted application, and cards in the same card stack can be aggregated into a deck.

Figure 10:
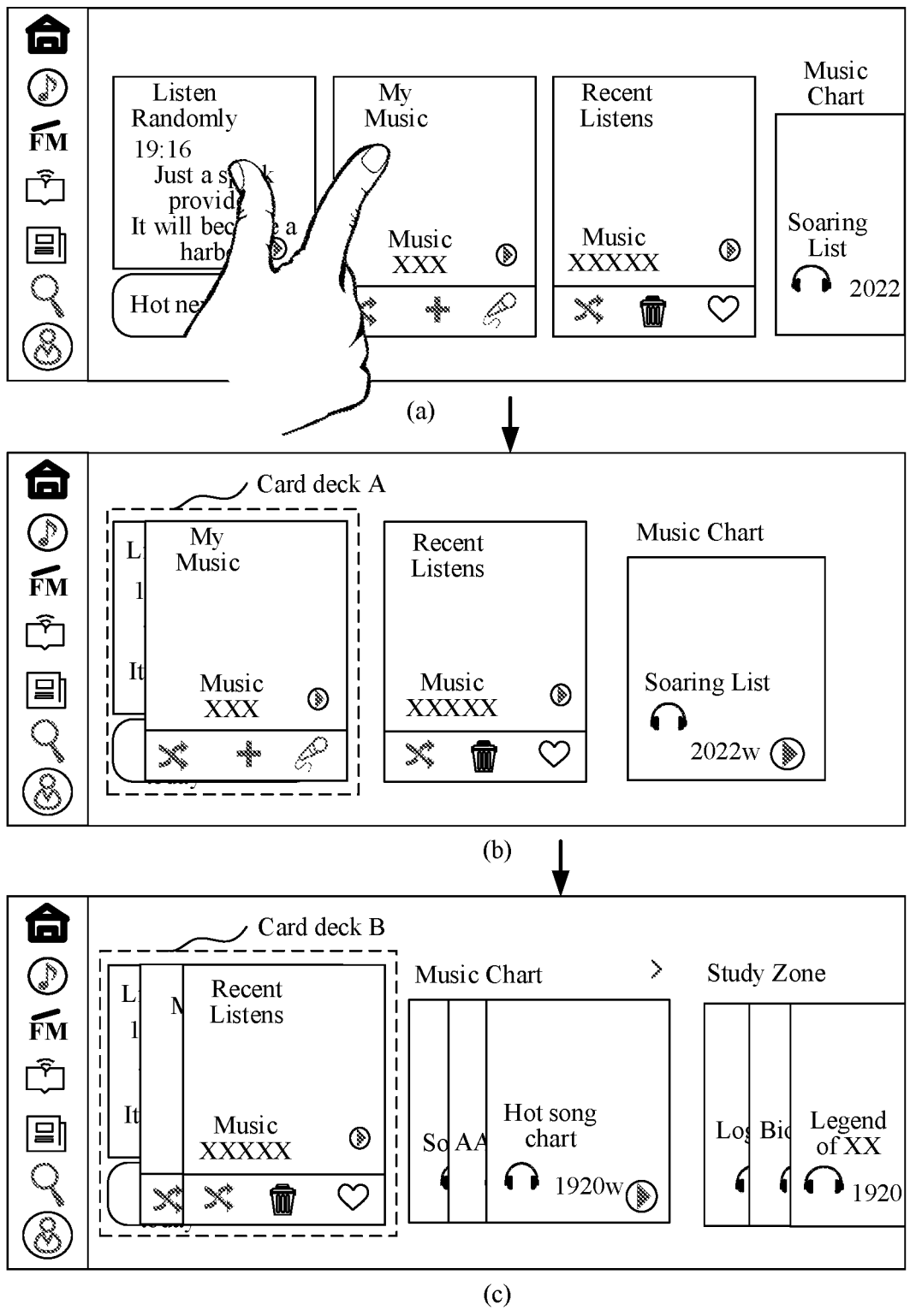
FIG. 10 is a schematic interface diagram of aggregating various card units in a vehicle-mounted application according to one embodiment.

As shown in FIG. 10(*a*), when the user pinches the card "Listen Randomly" and the card "My Music", the vehicle-mounted terminal moves the card "My Music" to the left and superimposes it on the card "Listen Randomly", and an interval between left edges of the two superimposed cards is 2 cm, resulting in a card deck A as shown in FIG. 10(*b*).

The card "Listen Randomly", the card "My Music", and the card "Recent Listens" are arranged in the same card stack. When the user pinches the card deck A and the card "Recent Listens", the vehicle-mounted terminal moves the card "Recent Listens" to the left and superimposes it on the card "Listen Randomly" in the card deck A. Moreover, an interval between left edges of the superimposed cards "Recent Listens" and "Listen Randomly" in the card deck A is 2 cm.

According to the same processing method, the user may form associated cards into a card deck by superimposing, so as to present various card decks in the card presentation region, such as a card deck B, a card deck "Music Chart", and a card deck "Study Zone" as shown in FIG. 10(*c*). The cards being associated refers to that the cards belong to the same card stack.

Figure 11:
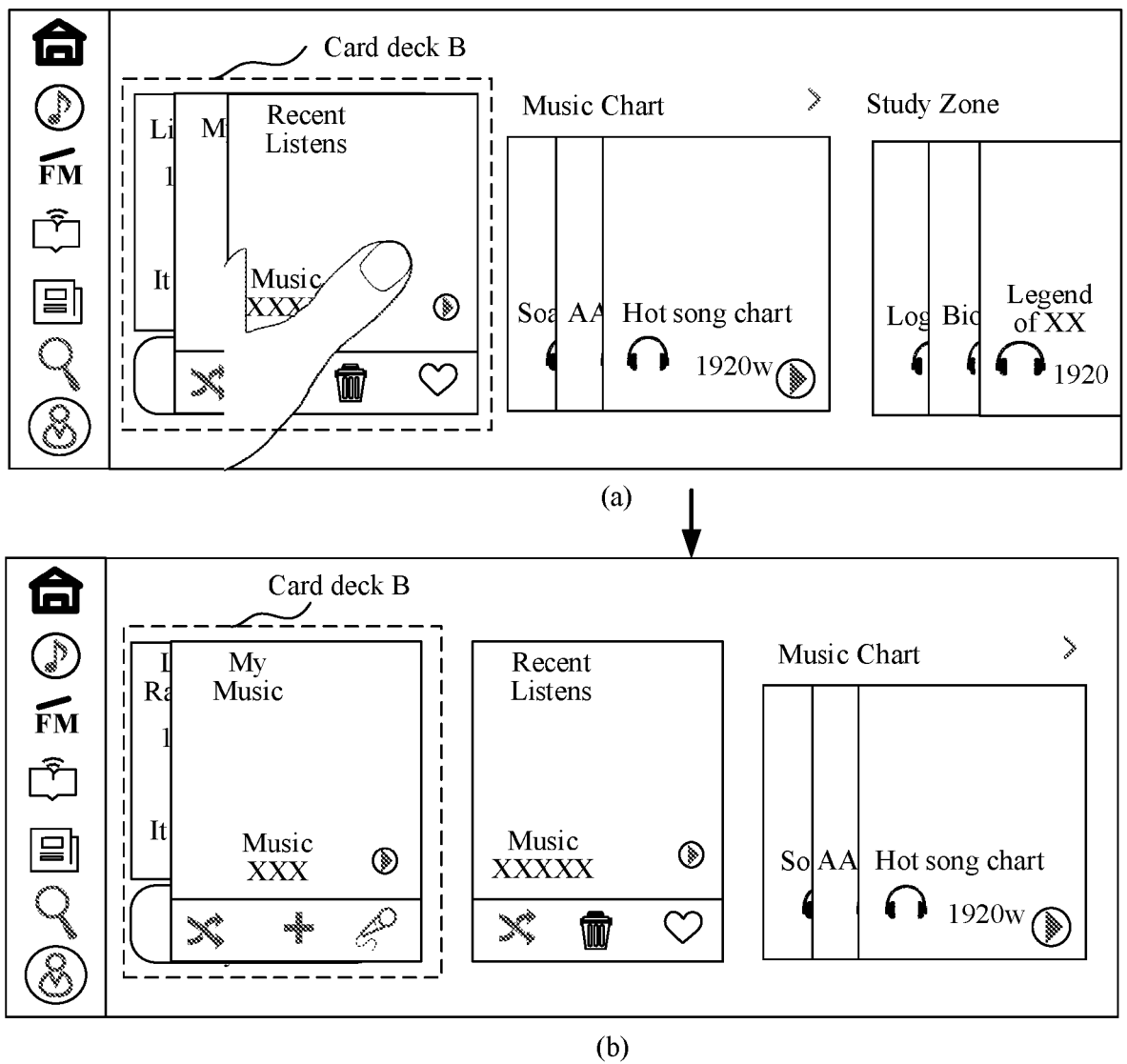
FIG. 11 is a schematic interface diagram of spreading a card deck in a vehicle-mounted application according to one embodiment.

As shown in FIG. 11(*a*), when the user swipes the card "Recent Listens" in the card deck B to the right, the vehicle-mounted terminal moves the card "Recent Listens" out from the card deck B and tiles and presents it in the card presentation region, as shown in FIG. 11(*b*).

In addition, as the card "Recent Listens" is gradually swiped to the right and presented, the vehicle-mounted terminal gradually swipes the card deck "Music Chart" and the card deck "Study Zone" to the right until the card "Recent Listens" is completely presented in the card presentation region. Moreover, along with the increase of the display area occupied by the card "Recent Listens" in the spreading process, the card deck "Study Zone" may be removed from the card presentation region, as shown in FIG. 11(*b*).

In this embodiment, the card unit presentation method is applied to the vehicle terminal, so that a driver can realize aggregation or spreading of information through a simple operation in the process of driving the vehicle, and the driver does not need to swipe a plurality of times to search for information, thereby improving the information search efficiency. In addition, the driver does not need to pay attention to the information presented on the display screen for a long time, which can reduce driving accidents.

In some embodiments, the user may aggregate various cards in the same card stack to form a card deck through voice, and may also spread the card in the card deck through voice, thereby improving the efficiency of information search. Moreover, in the process of driving the vehicle, the driver may directly realize the aggregation and spreading of the cards through voice, which can improve the safety of driving.

In one embodiment, a card unit presentation method is provided, including:

acquiring, by a terminal, categories to which various cards belong respectively, and classifying cards belonging to the same category into the same card stack corresponding to the category.

For cards without a belonging category, the terminal classifies the cards without a belonging category into the same card stack, and the cards in the same card stack may be aggregated to form a card deck.

The terminal presents a plurality of non-overlapping card units in a card presentation region, and the plurality of card units include at least one of a single card or a card deck.

In some embodiments, when a swipe gesture aggregation operation occurs, the terminal may determine a swipe-to-aggregate distance and a swipe-to-aggregate speed corresponding to the swipe gesture aggregation operation acting on at least two target card units, respectively.

When at least one of the swipe-to-aggregate distance or the swipe-to-aggregate speed meets an aggregation condition, in response to the swipe gesture aggregation operation for at least two target card units in the plurality of card units, target card units under the same card stack are superimposed at a preset interval according to card stacks to which the target card units belong respectively, so as to form a target card deck. Cards in the same target card deck belong to the same card stack.

In some embodiments, when at least one of the swipe-to-aggregate distance or the swipe-to-aggregate speed meets the aggregation condition, the terminal converts each card unit of the at least two target card units acted on by the swipe gesture aggregation operation into a corresponding abbreviated card unit. According to the card stacks to which the target card units belong respectively, the abbreviated card units under the same card stack are aggregated, so as to form a target card deck.

In some embodiments, when at least one of the swipe-to-aggregate distance or the swipe-to-aggregate speed meets the aggregation condition, for the at least two target card units acted on by the swipe gesture aggregation operation and various card units between the two target card units, the terminal superimposes, according to card stacks to which the target card units belong respectively, target card units under the same card stack at a preset interval, so as to form a target card deck.

In some embodiments, when at least one of the swipe-to-aggregate distance or the swipe-to-aggregate speed meets the aggregation condition, the terminal converts at least two target card units acted on by the swipe gesture aggregation operation and card units between the two target card units into corresponding abbreviated card units. According to the card stacks to which the target card units belong respectively, the abbreviated card units under the same card stack are aggregated, so as to form a target card deck.

In some embodiments, when at least one of the swipe-to-aggregate distance or the swipe-to-aggregate speed meets the aggregation condition, the terminal aggregates all cards in the card stacks corresponding to the at least two target card units acted on by the swipe gesture aggregation operation according to the corresponding card stacks, so as to form at least one target card deck. The aggregation method may be superimposing various target card units corresponding to the same card stack at a preset interval to form a card deck, or converting various target card units corresponding to the same card stack into corresponding abbreviated card units, and aggregating the abbreviated card units into a target card deck.

In some embodiments, when an air gesture aggregation operation occurs, the air gesture aggregation operation is mapped to the card presentation region to determine at least two target card units acted on by the air gesture aggregation operation. A move-to-aggregate distance and a move-to-aggregate speed corresponding to the air gesture aggregation operation acting on at least two target card units are determined respectively. When at least one of the move-to-aggregate distance or the move-to-aggregate speed meets the aggregation condition, target card units under the same card stack are aggregated into a target card deck according to the card stacks to which the target card units belong respectively, so as to form at least one target card deck. The aggregation method is the same as the aggregation method of the swipe gesture aggregation operation, which may be superimposing at a preset interval or converting into corresponding abbreviated card units.

In some embodiments, in response to a voice aggregation operation for at least two target card units in the plurality of card units, the terminal aggregates all cards under card stacks corresponding to the at least two target card units specified by the voice aggregation operation according to the corresponding card stacks, so as to form at least one target card deck.

Along with a reduction of a display area occupied by the target card deck formed by aggregation, the terminal moves card units originally accommodated in the card presentation region so that the card units are arranged adjacently in sequence, and presents, in a process of moving the originally accommodated card units, at least one subsequent card unit adjacently in an idle position of the card presentation region, so as to dynamically adjust the arrangement layout of the card units currently accommodated in the card presentation region.

When a swipe gesture spreading operation occurs, the terminal determines a swipe-to-spread distance and a swipe-to-spread speed of the swipe gesture spreading operation acting on at least one card.

When at least one of the swipe-to-spread distance or the swipe-to-spread speed meets a spreading condition, the terminal tiles and presents the at least one card swiped by the swipe gesture spreading operation, so as to form the card deck into at least two non-overlapping card units.

In some embodiments, when an air gesture spreading operation occurs, the terminal maps the air gesture spreading operation to the card presentation region to determine at least one card in the card deck acted on by the air gesture spreading operation.

The terminal determines a move-to-spread distance and a move-to-spread speed corresponding to the air gesture spreading operation acting on the at least one card. When at least one of the move-to-spread distance or the move-to-spread speed meets the spreading condition, the terminal tiles and presents the at least one card acted on by the air gesture spreading operation, so as to form the card deck into at least two non-overlapping card units.

In some embodiments, in response to the voice spreading operation for the card deck in the card presentation region, the terminal tiles and presents all cards in the card deck acted on by the voice spreading operation, and the tiled and presented cards are non-overlapping.

Along with an increase of a display area occupied by at least two card units formed by spreading, the terminal dynamically adjusts the arrangement layout of the card units accommodated in the card presentation region.

In this embodiment, a plurality of non-overlapping card units are presented in the card presentation region, and the plurality of card units include at least one of a single card or a card deck. In response to a swipe gesture aggregation operation for at least two target card units in the plurality of card units, the swipe-to-aggregate distance and/or the swipe-to-aggregate speed corresponding to the swipe gesture aggregation operation are used as conditions for judging whether to aggregate the target card units, which can avoid the card aggregation due to a misinterpretation of the user's interactions with the interface. In addition, a variety of aggregation methods such as the swipe gesture aggregation operation and the air gesture aggregation operation are provided, so that the user can realize the aggregation of a plurality of cards through one contact aggregation operation or non-contact aggregation operation, which can meet requirements of the users in different scenarios, and is simple in operation. Quickly classifying a plurality of cards into a deck through one gesture aggregation operation can improve the efficiency of card aggregation, and can present more cards in the card presentation region, which is convenient for the user to search.

In response to a swipe-to-spread operation of the user for the card deck in the card presentation region, the card deck corresponding to the swipe-to-spread operation is spread to form at least two non-overlapping card units, so that the card deck can be spread, thereby facilitating the user to view detailed information of the cards in the card deck. Along with an increase of a display area occupied by the at least two card units formed by spreading, the arrangement layout of the card units accommodated in the card presentation region is dynamically adjusted, so that the card units presented in the card presentation region are still non-overlapping, which is convenient for the user to view card information.

The user may aggregate various cards in the same card stack to form a card deck through a voice, and may also spread the card in the card deck through voice, thereby realizing the aggregation and spreading of cards through the voice, which is easier to operate and suitable for different users to operate in various scenarios.

Although steps of the flowcharts in FIG. 2 and FIG. 8 are displayed sequentially according to arrows, the steps are not necessarily performed in the sequence indicated by the arrows. Unless otherwise explicitly specified in this specification, execution of the steps is not strictly limited, and the steps may be performed in other sequences. In addition, at least some steps in FIG. 2 and FIG. 8, may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Figure 12:
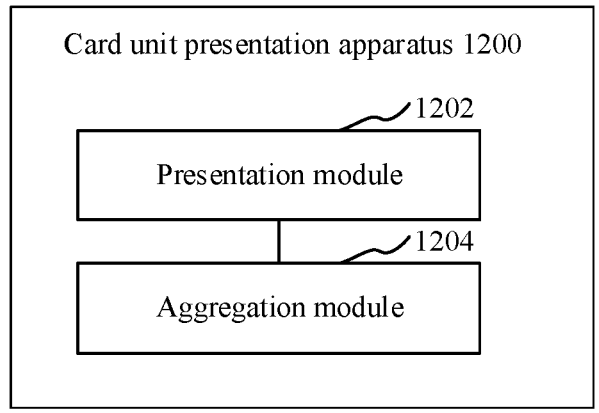
FIG. 12 is a structural block diagram of a card unit presentation apparatus according to one embodiment.

In one embodiment, as shown in FIG. 12, a card unit presentation apparatus 1200 is provided. The apparatus may adopt software modules or hardware modules, or a combination of the two to become a part of a computer device. The apparatus specifically includes: a presentation module 1202 and an aggregation module 1204.

The presentation module 1202 is configured to present a plurality of non-overlapping card units in a card presentation region, the plurality of card units including at least one of a single card or a card deck.

The aggregation module 1204 is configured to aggregate, in response to an aggregation operation for at least two target card units in the plurality of card units, the at least two target card units to form at least one target card deck; cards in the same target card deck being associated.

In this embodiment, a plurality of non-overlapping card units are presented in the card presentation region. The plurality of card units include at least one of a single card or a card deck. In response to the aggregation operation for at least two target card units in the plurality of card units, the at least two target card units are aggregated into at least one target card deck, and cards in the same target card deck are associated, so that associated cards can be aggregated through the aggregation operation to reduce an area occupied by the cards in the card presentation region. Aggregating the cards for presentation can present more cards in the card presentation region, which is convenient for the user to search for a required card, thereby improving the efficiency of the user in searching for information.

In one embodiment, the aggregation module 1204 is further configured to aggregate, in response to the aggregation operation for at least two target card units in the plurality of card units, target card units under the same card stack into a target card deck according to card stacks to which the target card units belong respectively, so as to form at least one target card deck.

In this embodiment, in response to the aggregation operation for at least two target card units in the plurality of card units, the target card units under the same card stack are aggregated into a deck according to the card stacks to which the target card units belong respectively. Therefore, associated cards can be quickly classified into the same deck through a simple operation to realize intelligent aggregation of cards. In addition, a plurality of cards are aggregated into a deck, which can reduce a display area occupied by the card units.

In one embodiment, the aggregation operation includes a gesture aggregation operation. The aggregation module 1204 is further configured to aggregate, for two target card units acted on by the gesture aggregation operation and various target card units between the two target card units, target card units under the same card stack into a target card deck according to the card stacks to which the target card units belong respectively, so as to form at least one target card deck; or determine target card stacks corresponding to the at least two target card units acted on by the gesture aggregation operation, and aggregate all card units under the same target card stack into one target card deck, so as to form at least one target card deck.

In this embodiment, in response to the gesture aggregation operation for two target card units in the plurality of card units, the two target card units acted on by the gesture aggregation operation and the card units between the two target card units may be aggregated into a deck, so that a plurality of cards may be quickly classified into a deck through one gesture aggregation operation, which can improve the efficiency of card aggregation.

In one embodiment, the gesture aggregation operation includes a swipe gesture aggregation operation. The apparatus further includes: an aggregation condition judgment module. The aggregation condition judgment module is configured to determine, when a swipe gesture aggregation operation occurs, a swipe-to-aggregate distance and a swipe-to-aggregate speed corresponding to the swipe gesture aggregation operation acting on at least two target card units respectively; and perform, when at least one of the swipe-to-aggregate distance or the swipe-to-aggregate speed meets an aggregation condition, the step of responding to an aggregation operation for at least two target card units in the plurality of card units.

In this embodiment, in response to the swipe gesture aggregation operation for at least two target card units in the plurality of card units, the swipe-to-aggregate distances and the swipe-to-aggregate speeds corresponding to the swipe gesture aggregation operation acting on the at least two target card units are determined respectively, and the swipe-to-aggregate distances and the swipe-to-aggregate speeds are used as conditions for judging whether to aggregate the target card units, which can avoid the card aggregation caused by a misoperation of the user.

In one embodiment, the gesture aggregation operation includes an air gesture aggregation operation. The apparatus further includes: an aggregation condition judgment module. The aggregation condition judgment module is configured to map, when an air gesture aggregation operation occurs, the air gesture aggregation operation to the card presentation region to determine at least two target card units acted on by the air gesture aggregation operation; determine a move-to-aggregate distance and a move-to-aggregate speed corresponding to the air gesture aggregation operation acting on at least two target card units respectively; and perform, when at least one of the move-to-aggregate distance or the move-to-aggregate speed meets an aggregation condition, the step of responding to the aggregation operation for at least two target card units among the plurality of card units.

In this embodiment, by mapping the air gesture aggregation operation to the card presentation region, various target card units acted on by the air gesture aggregation operation can be determined, thereby determining the move-to-aggregate distances and move-to-aggregate speeds of the air gesture aggregation operation corresponding to the target card units, the move-to-aggregate distances and move-to-aggregate speeds are used as conditions for judging whether to aggregate the target card units, which can avoid card aggregation caused by a misoperation of the user. In addition, a plurality of cards in the same card stack are aggregated through the air gesture aggregation operation. When it is inconvenient for the user to realize the card aggregation by direct contact, the user is provided with a method for realizing card aggregation by a non-contact gesture, which can meet uses of users in different scenarios, and is convenient in operation.

In one embodiment, the aggregation operation includes a voice aggregation operation, the aggregation module 1204 is further configured to determine target card stacks corresponding to at least two target card units specified by the voice aggregation operation, and aggregate all card units under the same target card stack into a target card deck, so as to form at least one target card deck.

In this embodiment, through the voice aggregation operation of the user, all cards in the card stack corresponding to each target card unit specified by the voice aggregation operation are aggregated according to the corresponding card stack, which can quickly aggregate a plurality of cards in the card stack. The user realizes the aggregation of cards through voice, and the operation is fast and simple.

In some embodiments, the apparatus further includes: a classification module. The classification module is configured to acquire categories to which various cards belong respectively, and classify cards belonging to the same category into the same card stack corresponding to the category; and classify, for cards without a belonging category, the cards without a belonging category collectively into the same card stack.

In this embodiment, the cards belonging to the same category are classified into the same card stack corresponding to the category, so that the corresponding card stack may be quickly defined directly according to the category of the card. The cards without a belonging category are collectively classified into the same card stack to realize the definition of the card stack for the cards without a belonging category.

In one embodiment, the aggregation module 1204 is further configured to superimpose at least two target card units acted on by the aggregation operation at a preset interval, so as to form at least one target card deck; or convert each card unit of the at least two target card units acted on by the aggregation operation into a corresponding abbreviated card unit, and aggregate the abbreviated card units to form at least one target card deck.

In this embodiment, at least two target card units acted on by the aggregation operation are superimposed at a preset interval, so that each card in the target card deck formed by the superposition may be partially presented, so as to present partial information of each card, which is convenient for the user to search.

By converting various card units acted on by the aggregation operation into corresponding abbreviated card units, the card units can be presented in an abbreviated form, so that the card units occupy a smaller display area. By aggregating the abbreviated card units, the associated cards can be classified into the same deck, which is convenient for the user to search for a required card.

In one embodiment, the aggregation module 1204 is further configured to determine, when an aggregation operation occurs, at least two target card units specified by the aggregation operation; swipe, in an order from left to right for various cards belonging to the same target card stack in the at least two target card units, a card on a right side to cover a card on a left side at a preset interval to obtain a target card deck corresponding to the corresponding target card stack, so as to finally form at least one target card deck; wherein the card covered at the preset interval in each target card deck displays at most a part of card content.

In this embodiment, for the cards belonging to the same card stack in the card unit specified by the aggregation operation, a card on a right side is swiped in an order from left to right to cover a card on a left side at a preset interval, so that each card in the target card deck formed by superimposing may be partially presented, so as to present a part of information of each card, which is convenient for the user to search.

In an embodiment, the apparatus further includes an adjustment module; and the adjustment module is configured to dynamically adjust, along with a reduction of a display area occupied by the target card deck formed by aggregation, the arrangement layout of the card units accommodated in the card presentation region.

In this embodiment, along with the reduction of the display area occupied by the target card deck formed by aggregation, the arrangement layout of the presented card units is dynamically adjusted, so that the aggregation of cards and the dynamic adjustment of the presentation area of the cards may be simultaneously achieved through the aggregation operation of the user, and the operation is simple.

In one embodiment, the adjustment module is further configured to move, along with the reduction of the display area occupied by the target card deck formed by aggregation, card units originally accommodated in the card presentation region so that the card units are arranged adjacently in sequence, and present, in a process of moving the originally accommodated card units, at least one subsequent card unit adjacently in an idle position of the card presentation region, so as to dynamically adjust the arrangement layout of the card units currently accommodated in the card presentation region.

In this embodiment, along with the reduction of the display area occupied by the target card deck formed by aggregation, an idle position can be vacated in the card presentation region, and the idle position is used for displaying at least one subsequent card unit, so that the card presentation region can show more card units. In the process of aggregating various card units to form the target card deck, the card units originally accommodated in the card presentation region are automatically and dynamically adjusted along with the formation of the target card deck, so that the card units are still arranged adjacent to each other to avoid a subsequently presented card unit from being interspersed and presented between the originally accommodated card units, so that the boundary between the originally presented card unit and the subsequently presented card unit is clear, the display is more intuitive, and it is more convenient for the user to search for information.

In an embodiment, the apparatus further includes a spreading module; and the spreading module is configured to spread, in response to a spreading operation for a card deck in the card presentation region, the card deck corresponding to the spreading operation to form at least two non-overlapping card units.

The adjustment module is further configured to dynamically adjust, along with an increase of a display area occupied by the at least two card units formed by spreading, the arrangement layout of the card units accommodated in the card presentation region.

In this embodiment, in response to the spreading operation of the user for the card deck in the card presentation region, the card deck corresponding to the spreading operation is spread to form at least two non-overlapping card units, so that the card deck can be spread to facilitate the user to view detailed information of cards in the card deck. Along with an increase of a display area occupied by the at least two card units formed by spreading, the arrangement layout of the card units accommodated in the card presentation region is dynamically adjusted, so that the card units presented in the card presentation region are still non-overlapping, which is convenient for the user to search for card information.

In one embodiment, the spreading operation includes a gesture spreading operation. The spreading module is further configured to tile and present, in response to the gesture spreading operation for at least one card in the card deck, at least one card specified by the gesture spreading operation in the card presentation region, so as to form the card deck into at least two non-overlapping card units.

In this embodiment, in response to the gesture spreading operation of the user for at least one card in the presented card deck, at least one card specified by the gesture spreading operation is tiled and presented, so that a single card can be moved out from the card deck based on the gesture operation of the user and completely presented to the user, so that detailed information of the card may be displayed intuitively for the user to view. The cards in the card deck that the user does not need to view still exist in the form of a card deck, thereby reducing the occupation of the display area.

In one embodiment, the gesture spreading operation includes a swipe gesture spreading operation; the apparatus further includes: a spreading condition judgment module. The spreading condition judgment module is further configured to determine, when a swipe gesture spreading operation occurs, a swipe-to-spread distance and a swipe-to-spread speed of the swipe gesture spreading operation acting on at least one card; and perform, when at least one of the swipe-to-spread distance and the swipe-to-spread speed meets a spreading condition, the step of responding to the gesture spreading operation for at least one card in the card deck.

In this embodiment, when a swipe gesture spreading operation occurs, the swipe-to-spread distance and the swipe-to-spread speed of the swipe gesture spreading operation acting on at least one card are determined, and the swipe-to-aggregate distance and the swipe-to-aggregate speed are used as conditions for judging whether to spread the cards in the card deck. The cards are spread only when at least one of the swipe-to-aggregate distance or the swipe-to-aggregate speed meets the spreading condition, which can avoid a misoperation of the user and improve the accuracy of card spreading.

In one embodiment, the gesture spreading operation includes an air gesture spreading operation. The apparatus further includes: a spreading condition judgment module. The spreading condition judging module is further configured to map, when an air gesture spreading operation occurs, the air gesture spreading operation to the card presentation region to determine at least one card in the card deck acted on by the air gesture spreading operation; determine a move-to-spread distance and a move-to-spread speed corresponding to the air gesture spreading operation acting on the at least one card; and perform, when at least one of the move-to-spread distance or the move-to-spread speed meets a spreading condition, the step of responding to the gesture spreading operation for at least one card in the card deck.

In this embodiment, when an air gesture spreading operation occurs, the move-to-spread distance and the move-to-spread speed of the air gesture spreading operation acting on at least one card are determined, and the move-to-aggregate distance and/or the move-to-aggregate speed are used as conditions for judging whether to spread the cards in the card deck. The cards are spread only when at least one of the move-to-aggregate distance or the move-to-aggregate speed meets the spreading condition, which can avoid a misoperation of the user and improve the accuracy of card spreading. In addition, the card in the card deck may be spread through the air gesture spreading operation, so that the user can realize the spreading of the card without directly touching the card presentation region, so as to meet requirements of users in different scenarios.

In one embodiment, the spreading operation is a voice spreading operation. The spreading module is further configured to tile and present, in response to a voice spreading operation for a card deck in the card presentation region, all cards in the card deck acted on by the voice spreading operation, the tiled and presented cards being non-overlapping.

In this embodiment, through the voice spreading operation of the user, all cards in the card deck specified by the voice spreading operation are tiled and presented in the card presentation region, so that the user can realize the spreading of the cards in the card deck through the voice, and the operation is fast and simple.

In one embodiment, the apparatus is performed by a vehicle-mounted terminal, the card presentation region is a presentation region provided by a display screen of the vehicle-mounted terminal, and the card is provided by at least one vehicle-mounted application running on the vehicle-mounted terminal.

In this embodiment, the card unit presentation method is applied to the vehicle terminal, so that a driver can realize aggregation or spreading of information through a simple operation in the process of driving the vehicle, and the driver does not need to swipe a plurality of times to search for information, thereby improving the information search efficiency. In addition, the driver does not need to pay attention to the information presented on the display screen for a long time, which can reduce driving accidents.

In some embodiments, the user may aggregate various cards in the same card stack to form a card deck through voice, and may also spread the card in the card deck through voice, thereby improving the efficiency of information search. Moreover, in the process of driving the vehicle, the driver may directly realize the aggregation and spreading of the cards through voice, which can improve the safety of driving.

For the specific definition of the card unit presentation apparatus, reference may be made to the above definition of the card unit presentation method. The modules in the foregoing card unit presentation apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 13. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer-readable instruction. The internal memory provides an environment for running of the operating system and the computer-readable instruction in the non-volatile storage medium. The communication interface of the computer device is configured to communicate with an external terminal in a wired or a wireless manner, and the wireless manner can be implemented by using WIFI, an operator network, NFC, or other technologies. The computer-readable instruction is executed by the processor to implement the card unit presentation method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 13:
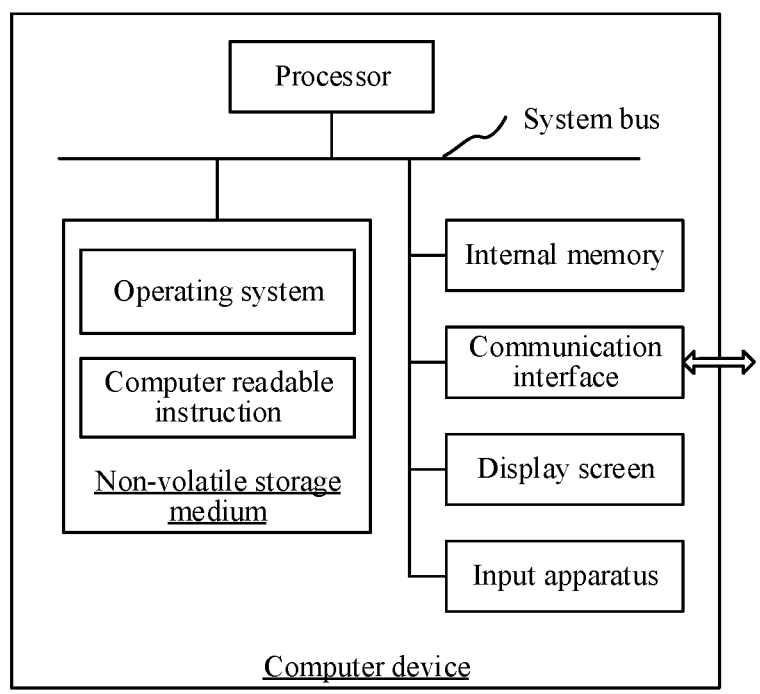
FIG. 13 is a diagram of an internal structure of a computer device according to an embodiment.

A person skilled in the art may understand that, the structure shown in FIG. 13 is only a block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, a computer device is further provided, including memory and one or more processors. The memory stores computer-readable instructions. The computer-readable instructions, when executed by the processor, cause the processor to perform the steps in the foregoing method embodiments.

In an embodiment, one or more non-volatile readable storage media are provided, storing computer-readable instructions, the computer-readable instructions, when executed by the processor, implementing the steps in the foregoing method embodiments.

In an embodiment, a computer program product is provided, including computer-readable instructions, the computer-readable instructions, when executed by one or more processors, causing the one or more processors to implement the steps in the foregoing method embodiments.

A person of ordinary skill in the art may understand that all or some of the procedures of the methods of the foregoing embodiments may be implemented by computer-readable instructions instructing relevant hardware. The computer-readable instructions may be stored in a non-volatile (e.g., non-transitory) computer-readable storage medium. When the computer-readable instructions are executed, the procedures of the embodiments of the foregoing methods may be included. Any reference to a memory, a storage, a database, or another medium used in the embodiments provided in this application may include a non-volatile memory or a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, which are described specifically and in detail, but cannot be construed as a limitation to the patent scope of this application. A person of ordinary skill in the art may make various changes and improvements without departing from the ideas of this application, which shall all fall within the protection scope of this application. Therefore, the protection scope of this patent application is subject to the protection scope of the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs card aggregation and/or aggregation condition judgment. In practical application, the foregoing functions may be allocated to and completed by different functional modules according to requirements, that is, an inner structure of a device is divided into different functional modules to implement all or a part of the functions described above.

What is claimed is:

1. A card unit presentation method performed by a terminal, the method comprising:
   presenting a plurality of card units in a non-overlapping manner within a card presentation region, each of the plurality of card units corresponding to a respective application icon, and all the card units in the plurality of card units belong to the same category;
   in response to detecting an aggregation operation on at least two target card units in the plurality of card units, the aggregation operation including one of a gesture aggregation operation, a voice aggregation operation, a cursor aggregation operation, or a key aggregation operation:

aggregating the at least two target card units to form at least one target card deck that contains the at least two target card units in a partially overlapping manner while at least one card unit in the plurality of card units not subject to the aggregation operation remains in the non-overlapping manner, wherein cards in a respective target card deck belong to the same category; and concurrently displaying within the card presentation region (i) the at least one target card deck, (ii) the at least one card unit, and (iii) a first card unit, wherein the first card unit is distinct from the plurality of card units and the first card unit is not displayed within the card presentation region before the aggregation operation; and after the aggregation operation, detecting a spreading operation on the at least one target card deck; and in response to detecting the spreading operation:
spreading the at least one target card deck to form at least two card units in a non-overlapping manner; and concurrently displaying within the card presentation region (i) the at least two card units and (ii) the at least one card unit, and removing the first card unit from being displayed within the card presentation region.

2. The method according to claim 1, wherein aggregating the at least two target card units to form the at least one target card deck includes:
in response to detecting the aggregation operation on the at least two target card units in the plurality of card units:
aggregating target card units under the same card stack into a respective target card deck of the at least one target card deck according to card stacks to which the target card units belong respectively, so as to form the at least one target card deck.

3. The method according to claim 2, wherein:
the aggregation operation comprises a gesture aggregation operation; and
aggregating the target card units under the same card stack into the respective target card deck includes:
aggregating, for two target card units acted on by the gesture aggregation operation and various target card units between the two target card units, target card units under the same card stack into a respective target card deck according to the card stacks to which the target card units belong respectively, so as to form the at least one target card deck.

4. The method according to claim 2, wherein:
the aggregation operation comprises a gesture aggregation operation; and
aggregating the target card units under the same card stack into the respective target card deck includes:
determining target card stacks to which at least two target card units acted on by the gesture aggregation operation belong; and
aggregating all card units under the same target card stack into a respective target card deck, so as to form the at least one target card deck.

5. The method according to claim 1, wherein:
the gesture aggregation operation is a swipe gesture aggregation operation; and
the method further comprises:
determining, when the swipe gesture aggregation operation occurs, a swipe-to-aggregate distance and a swipe-to-aggregate speed corresponding to the swipe gesture aggregation operation acting on the at least two target card units respectively; and in accordance with a determination that at least one of the swipe-to-aggregate distance or the swipe-to-aggregate speed meets an aggregation condition, responding to the detected aggregation operation for the at least two target card units in the plurality of card units.

6. The method according to claim 1, wherein:
the gesture aggregation operation is an air gesture aggregation operation; and
the method further comprises:
in accordance with a determination that the air gesture aggregation operation has occurred, mapping the air gesture aggregation operation to the card presentation region to determine at least two target card units acted on by the air gesture aggregation operation;
determining a move-to-aggregate distance and a move-to-aggregate speed corresponding to the air gesture aggregation operation acted on the at least two target card units respectively; and in accordance with a determination that at least one of the move-to-aggregate distance or the move-to-aggregate speed meets an aggregation condition, responding to the detected aggregation operation for the at least two target card units in the plurality of card units.

7. The method according to claim 2, wherein:
the aggregation operation comprises a voice aggregation operation, and;
aggregating the target card units under the same card stack into the respective target card deck according to the card stacks to which the target card units belong respectively, so as to form at least one target card deck comprises:
determining target card stacks corresponding to at least two target card units specified by the voice aggregation operation; and
aggregating all card units under the same target card stack into a target card deck, so as to form at least one target card deck.

8. The method according to claim 2, further comprising:
acquiring categories to which various cards belong respectively, and classifying cards belonging to the same category into the same card stack corresponding to the category; and
classifying, for cards without a belonging category, the cards without a belonging category collectively into the same card stack.

9. The method according to claim 1, wherein the aggregating the at least two target card units to form the at least one target card deck comprises:
superimposing, at a preset interval, the at least two target card units acted on by the aggregation operation to form at least one target card deck.

10. The method according to claim 1, wherein the aggregating the at least two target card units to form at least one target card deck comprises:
converting each card unit of the at least two target card units acted on by the aggregation operation into a corresponding abbreviated card unit, and aggregating the abbreviated card units to form at least one target card deck.

11. The method according to claim 9, wherein the superimposing the at least two target card units acted on by the aggregation operation to form at least one target card deck comprises:

determining, when an aggregation operation occurs, at least two target card units specified by the aggregation operation; and swiping, in an order from left to right for various cards belonging to the same target card stack in the at least two target card units, a card on a right side to cover a card on a left side at a preset interval to obtain a target card deck corresponding to the corresponding target card stack, so as to form the at least one target card deck, wherein the card covered at the preset interval in each target card deck displays a portion that is less than all of card content.

12. The method according to claim 1, further comprising:
dynamically adjusting, along with a reduction of a display area occupied by the target card deck formed by aggregation, an arrangement layout of card units accommodated in the card presentation region.

13. The method according to claim 12, wherein dynamically adjusting the arrangement layout of card units accommodated in the card presentation region comprises:

moving, along with the reduction of the display area occupied by the target card deck formed by aggregation, card units originally accommodated in the card presentation region so that the card units are arranged adjacently in sequence, and presenting, in a process of moving the originally accommodated card units, at least a part of at least one subsequent card unit adjacently in an idle position of the card presentation region, so as to dynamically adjust the arrangement layout of the card units currently accommodated in the card presentation region.

14. The method according to claim 1, further comprising:
in response to detecting the spreading operation:
dynamically adjusting, along with an increase of a display area occupied by at least two card units formed by spreading, an arrangement layout of the card units accommodated in the card presentation region.

15. The method according to claim 14, wherein dynamically adjusting the arrangement layout of the card units accommodated in the card presentation region comprises:

moving, along with the increase of the display area occupied by at least two card units formed by spreading, the card units originally accommodated in the card presentation region so that the card units are arranged adjacently in sequence, and removing from display, in a process of moving the originally accommodated card units, at least a part of at least one card unit in the originally accommodated card units from the card presentation region, so as to dynamically adjust the arrangement layout of the card units currently accommodated in the card presentation region.

16. The method according to claim 1, wherein:
the spreading operation comprises a gesture spreading operation; and
spreading the at least one target card deck to form the at least two card units in the non-overlapping manner comprises:
in response to detecting the gesture spreading operation, tiling and presenting the at least one target card deck in the card presentation region so as to form the at least two card units in the non-overlapping manner.

17. The method according to claim 16, wherein:
the gesture spreading operation comprises a swipe gesture spreading operation; and
the method further comprises:

in accordance with a determination that the swipe gesture spreading operation has occurred, determining a swipe-to-spread distance and a swipe-to-spread speed of the swipe gesture spreading operation acting on the at least one card; and in accordance with determination that at least one of the swipe-to-spread distance or the swipe-to-spread speed meets a spreading condition, the operation of responding to a gesture spreading operation for at least one card in the card deck.

18. The method according to claim 16, wherein:
the gesture spreading operation comprises an air gesture spreading operation; and
the method further comprises:
mapping, when an air gesture spreading operation occurs, the air gesture spreading operation to the card presentation region to determine at least one card in the card deck acted on by the air gesture spreading operation;
determining a move-to-spread distance and a move-to-spread speed corresponding to the air gesture spreading operation acting on the at least one card; and
performing, when at least one of the move-to-spread distance and the move-to-spread speed meets a spreading condition, the operation of responding to a gesture spreading operation for at least one card in the card deck.

19. A computing device, comprising:
a display;
one or more processors; and
memory storing one or more programs, the one or more programs comprising instructions that, when executed by the one or more processors, cause the one or more processors to perform operations comprising:
presenting a plurality of card units in a non-overlapping manner within a card presentation region, each of the plurality of card units corresponding to a respective application icon, and all the card units in the plurality of card units belong to the same category;
in response to detecting an aggregation operation on at least two target card units in the plurality of card units, the aggregation operation including one of a gesture aggregation operation, a voice aggregation operation, a cursor aggregation operation, or a key aggregation operation:
aggregating the at least two target card units to form at least one target card deck that contains the at least two target card units in a partially overlapping manner while at least one card unit in the plurality of card units not subject to the aggregation operation remains in the non-overlapping manner, wherein cards in a respective target card deck belong to the same category; and
concurrently displaying within the card presentation region (i) the at least one target card deck, (ii) the at least one card unit, and (iii) a first card unit, wherein the first card unit is distinct from the plurality of card units and the first card unit is not displayed within the card presentation region before the aggregation operation; and
after the aggregation operation, detecting a spreading operation on the at least one target card deck; and
in response to detecting the spreading operation:
spreading the at least one target card deck to form at least two card units in a non-overlapping manner; and concurrently displaying within the card presentation region (i) the at least two card units and (ii) the at least one card unit, and removing the first card unit from being displayed within the card presentation region.

20. A non-transitory computer-readable storage medium, storing one or more instructions, the one or more instructions, when executed by one or more processors of a computing device, cause the one or more processors to perform operations comprising:

presenting a plurality of card units in a non-overlapping manner within a card presentation region, each of the plurality of card units corresponding to a respective application icon, and all the card units in the plurality of card units belong to the same category;

in response to detecting an aggregation operation on at least two target card units in the plurality of card units, the aggregation operation including one of a gesture aggregation operation, a voice aggregation operation, a cursor aggregation operation, or a key aggregation operation:

aggregating the at least two target card units to form at least one target card deck that contains the at least two target card units in a partially overlapping manner while at least one card unit in the plurality of card units not subject to the aggregation operation remains in the non-overlapping manner, wherein cards in a respective target card deck belong to the same category; and concurrently displaying within the card presentation region (i) the at least one target card deck, (ii) the at least one card unit, and (iii) a first card unit, wherein the first card unit is distinct from the plurality of card units and the first card unit is not displayed within the card presentation region before the aggregation operation; and after the aggregation operation, detecting a spreading operation on the at least one target card deck; and in response to detecting the spreading operation:

spreading the at least one target card deck to form at least two card units in a non-overlapping manner; and concurrently displaying within the card presentation region (i) the at least two card units and (ii) the at least one card unit, and removing the first card unit from being displayed within the card presentation region.

\* \* \* \* \*